(12) United States Patent
Hotelling et al.

(10) Patent No.: US 10,613,665 B2
(45) Date of Patent: Apr. 7, 2020

(54) TOUCH SCREEN STACK-UP PROCESSING

(71) Applicant: Apple Inc., Cupertino, CA (US)

(72) Inventors: Steven P. Hotelling, Los Gatos, CA (US); Brian R. Land, Woodside, CA (US); Mark Arthur Hamblin, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/703,829

(22) Filed: May 4, 2015

(65) Prior Publication Data

US 2015/0309641 A1 Oct. 29, 2015

Related U.S. Application Data

(63) Continuation of application No. 11/818,335, filed on Jun. 13, 2007, now abandoned.

(60) Provisional application No. 60/878,797, filed on Jan. 5, 2007.

(51) Int. Cl.

| | |
|---|---|
| *G06F 3/041* | (2006.01) |
| *G06F 3/044* | (2006.01) |
| *G06F 3/045* | (2006.01) |
| *G09G 3/36* | (2006.01) |

(52) U.S. Cl.
CPC ........... *G06F 3/0414* (2013.01); *G06F 3/041* (2013.01); *G06F 3/044* (2013.01); *G06F 3/045* (2013.01); *G06F 3/0412* (2013.01); *G09G 3/36* (2013.01); *G06F 2203/04101* (2013.01);

(Continued)

(58) Field of Classification Search
None
See application file for complete search history.

(56) References Cited

U.S. PATENT DOCUMENTS 5,137,484 A * 8/1992 Bohannon ............ G02F 1/1335
141/7
5,483,261 A 1/1996 Yasutake
5,488,204 A 1/1996 Mead et al.
(Continued)

FOREIGN PATENT DOCUMENTS

| JP | 2000-163031 A | 6/2000 |
|---|---|---|
| JP | 2002-342033 A | 11/2002 |

OTHER PUBLICATIONS

Final Office Action dated Jul. 7, 2011, for U.S. Appl. No. 11/818,335, filed Jun. 13, 2007, 17 pages.
(Continued)

*Primary Examiner* — Matthew Yeung
(74) *Attorney, Agent, or Firm* — Kubota & Basol LLP

(57) ABSTRACT

A multi-touch sensor panel is disclosed that can be produced by forming a plurality of first traces of substantially transparent conductive material on a first substrate, forming a plurality of second traces of the substantially transparent material, and creating a fluid-tight gap between the plurality of first traces and the plurality of second traces. The fluid-tight gap can then be filled with a fluid having substantially no bubbles and an optical index similar to the optical index of the first and second traces to make the gap and the first and second traces substantially transparent. The second and first traces can be oriented to cross over each other at crossover locations separated by the fluid, the crossover locations forming mutual capacitance sensors for detecting touches.

18 Claims, 36 Drawing Sheets

(52) U.S. Cl.
CPC .............. *G06F 2203/04104* (2013.01); *G06F 2203/04105* (2013.01); *G06F 2203/04111* (2013.01)

(56) References Cited

U.S. PATENT DOCUMENTS

| | | | |
|---|---|---|---|
| 5,543,589 | A | 8/1996 | Buchana et al. |
| 5,648,642 | A | 7/1997 | Miller et al. |
| 5,825,352 | A | 10/1998 | Bisset et al. |
| 5,835,079 | A | 11/1998 | Shieh |
| 5,847,690 | A | 12/1998 | Boie et al. |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 2004/0150629 | A1* | 8/2004 | Lee .................... G06F 3/041 345/173 |
| 2004/0204000 | A1* | 10/2004 | Dietrich ............. H04M 1/0214 455/550.1 |
| 2005/0041194 | A1* | 2/2005 | Lee .................... G02F 1/13394 349/155 |
| 2005/0083307 | A1* | 4/2005 | Aufderheide ......... G06F 3/044 345/173 |
| 2005/0253797 | A1* | 11/2005 | Kamada ............ G02F 1/133753 345/89 |
| 2006/0026521 | A1 | 2/2006 | Hotelling et al. |
| 2006/0197753 | A1 | 9/2006 | Hotelling |
| 2007/0070047 | A1* | 3/2007 | Jeon ................... G02F 1/13338 345/173 |
| 2008/0165139 | A1 | 7/2008 | Hamblin et al. |
| 2008/0202251 | A1* | 8/2008 | Serban .................... G01L 1/142 73/780 |

OTHER PUBLICATIONS

Lee, S.K. et al. (Apr. 1985). "A Multi-Touch Three Dimensional Touch-Sensitive Tablet," Proceedings of *CHI: ACM Conference on Human Factors in Computing Systems*, pp. 21-25.

Non-Final Office Action dated Jan. 26, 2011, for U.S. Appl. No. 11/818,335, filed Jun. 13, 2007, 15 pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Advisory Action received for U.S. Appl. No. 11/818,335, dated Nov. 23, 2011, 5 pages.

* cited by examiner

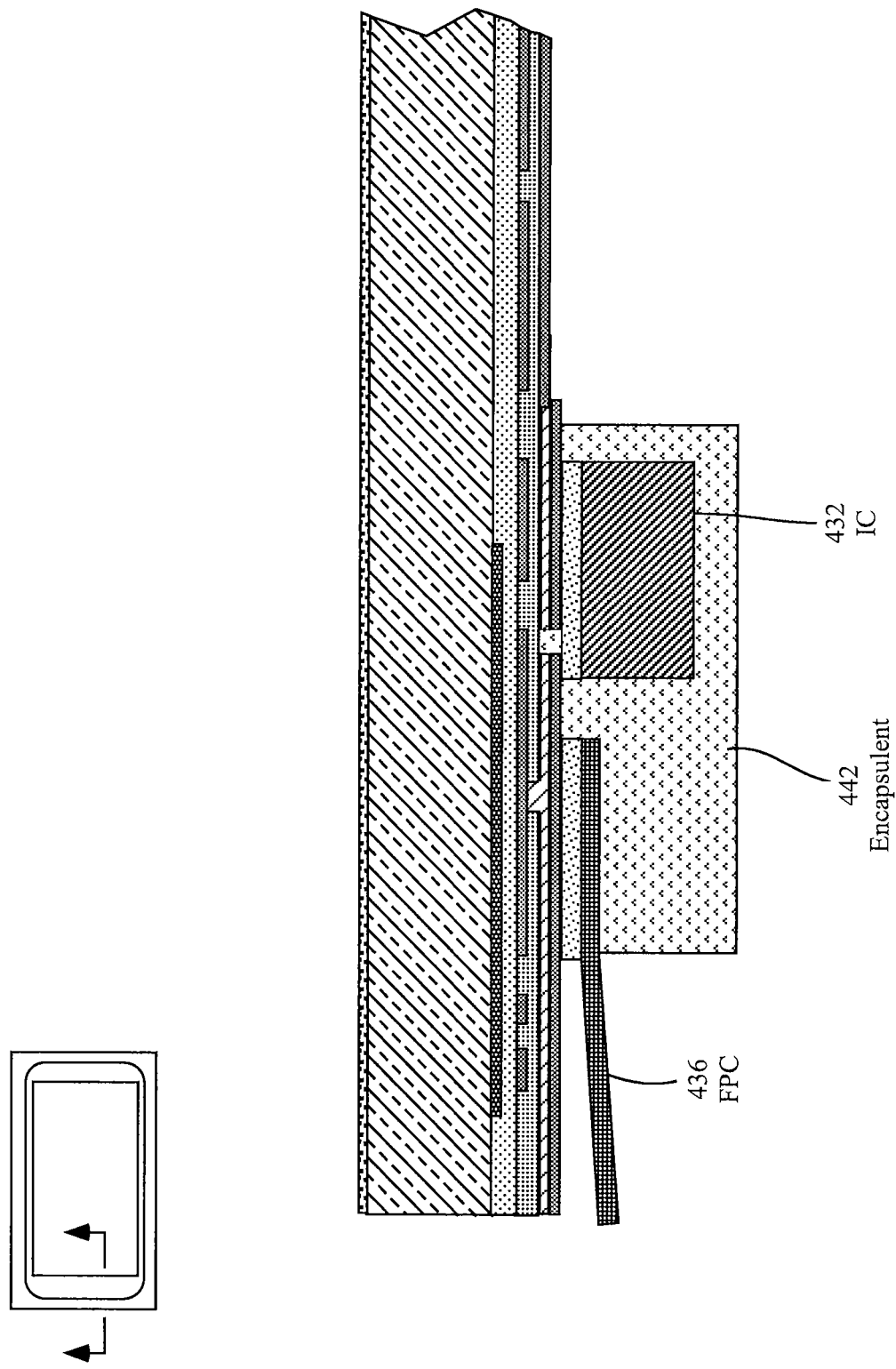

TOUCH SCREEN STACK-UP PROCESSING

CROSS-REFERENCE TO RELATED APPLICATIONS

The present invention is a continuation of U.S. patent application Ser. No. 11/818,335, filed Jun. 13, 2007, which claims the benefit under 35 USC 119(e) of U.S. provisional patent application Ser. No. 60/878,797 filed Jan. 5, 2007, the contents of which are incorporated by reference herein in their entirety.

FIELD OF THE INVENTION

This relates to touch screens, and more particularly, to methods and processes for forming the stack-up of materials comprising the touch screens.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of a display screen so that the touch-sensitive surface can cover the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch panels can include an array of touch sensors capable of detecting touch events (the touching of fingers or other objects upon a touch-sensitive surface). Future panels may be able to detect multiple touches (the touching of fingers or other objects upon a touch-sensitive surface at distinct locations at about the same time) and near touches (fingers or other objects within the near-field detection capabilities of their touch sensors), and identify and track their locations. Examples of multi-touch panels are described in Applicant's co-pending U.S. application Ser. No. 10/842,862 entitled "Multipoint Touchscreen," filed on May 6, 2004 and published as U.S. Publication Application No. 2006/0097991 on May 11, 2006, the contents of which are incorporated by reference herein.

Various materials, adhesives, and processing steps are required to make a touch screen stackup that is functional, cost-effective, and space-efficient.

SUMMARY OF THE INVENTION

A multi-touch sensor panel can be produced by first forming a plurality of first traces of substantially transparent conductive material on a first substrate, forming a plurality of second traces of the substantially transparent material, and creating a fluid-tight gap between the plurality of first traces and the plurality of second traces. The fluid-tight gap can then be filled with a fluid having substantially no bubbles and an optical index similar to the optical index of the first and second traces to make the gap and the first and second traces substantially transparent. The second and first traces can be oriented to cross over each other at crossover locations separated by the fluid, the crossover locations forming mutual capacitance sensors for detecting touches.

In particular, a touch screen can be formed by first forming column traces on the back of a cover glass, forming row traces on the top of a substrate, and laminating the cover glass and substrate together with spacers in between, forming a fluid-tight gap. The fluid-tight gap can be filled with fluid having optical properties similar to the row and column traces. Integrated circuits (ICs) and flexible printed circuits (FPCs) can be bonded to the cover glass and encapsulated. The cover glass and substrate can further be bonded to an LCD module. Alternatively, both the column and row traces can be formed on the back side of the cover glass, separated by an insulator with dielectric properties.

BRIEF DESCRIPTION OF THE DRAWINGS

FIGS. 4a through 4j illustrate an exemplary fourth touchscreen that can be formed by an exemplary second upper layer subassembly and the exemplary LCD module according to one embodiment of this invention.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

It should be understood that in all of the figures and descriptions that follow, the listed materials, properties and dimensions (listed in units of millimeters unless otherwise noted) are merely exemplary in nature and are not intended to limit the scope of the invention.

Figure 1A:
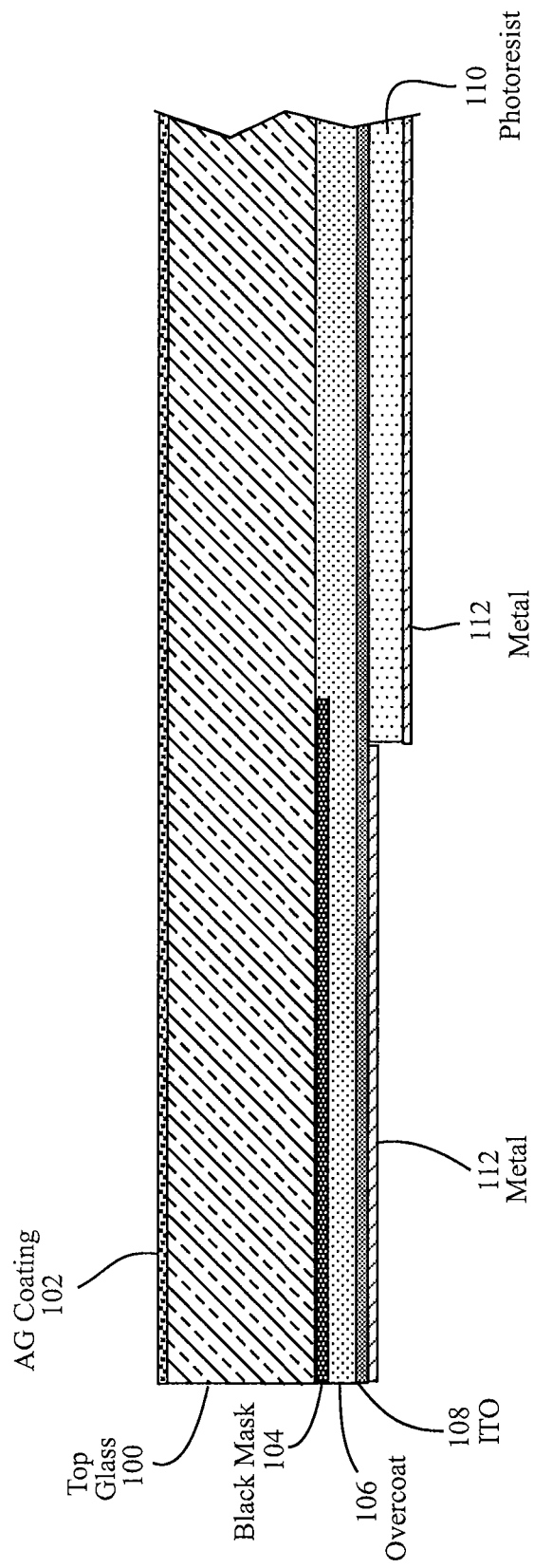
FIGS. 1a through 1n illustrate an exemplary first touchscreen that can be formed by combining an exemplary first upper layer subassembly, an exemplary first lower layer subassembly, and an exemplary LCD module according to one embodiment of this invention.
Figure 1B:
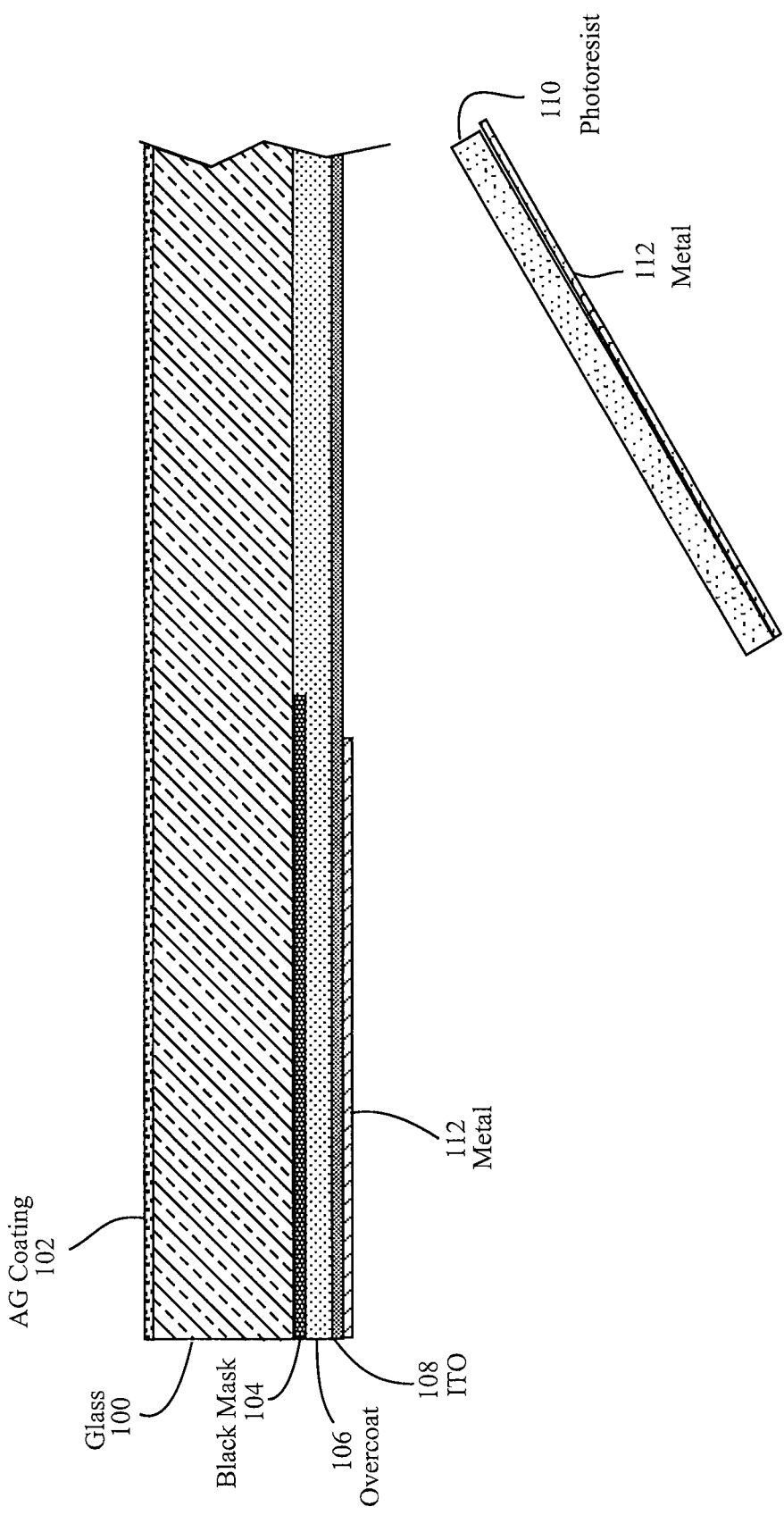
Figure 1C:
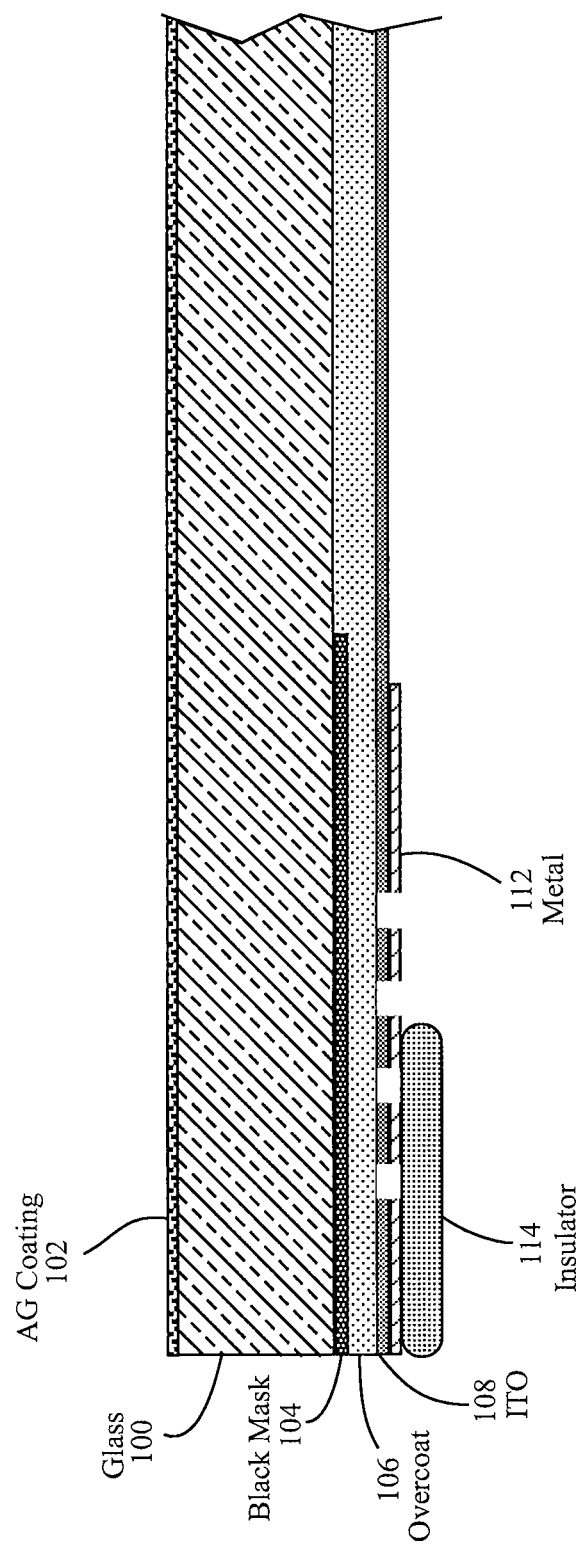
Figure 1D:
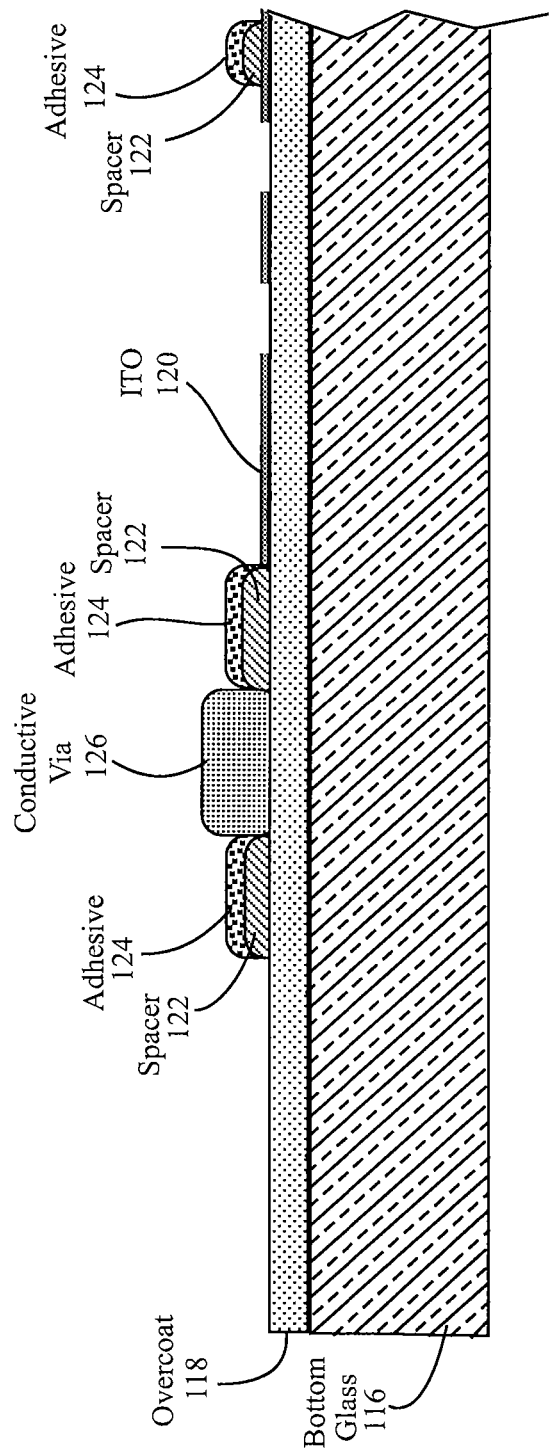
Figure 1E:
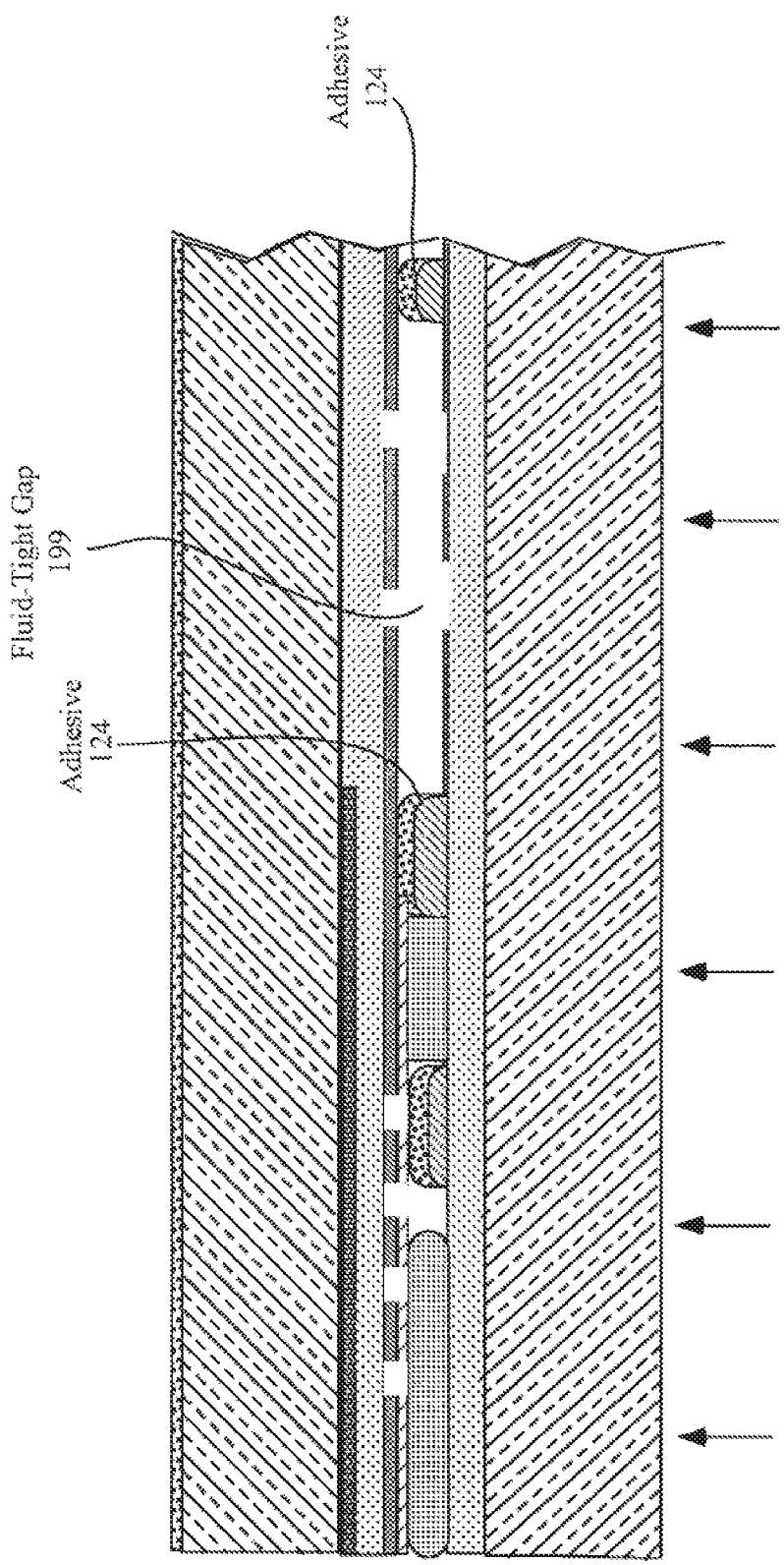
Figure 1F:
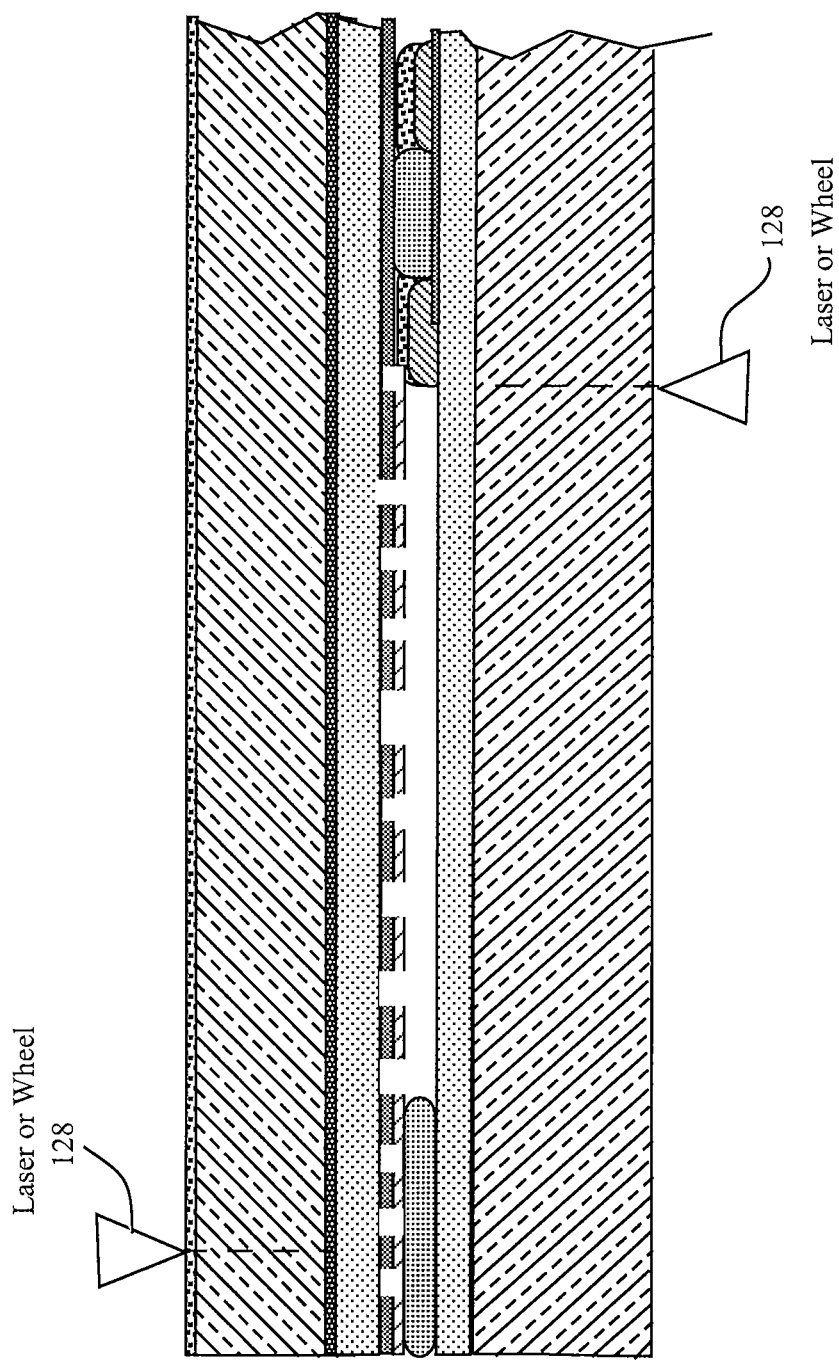
Figure 1G:
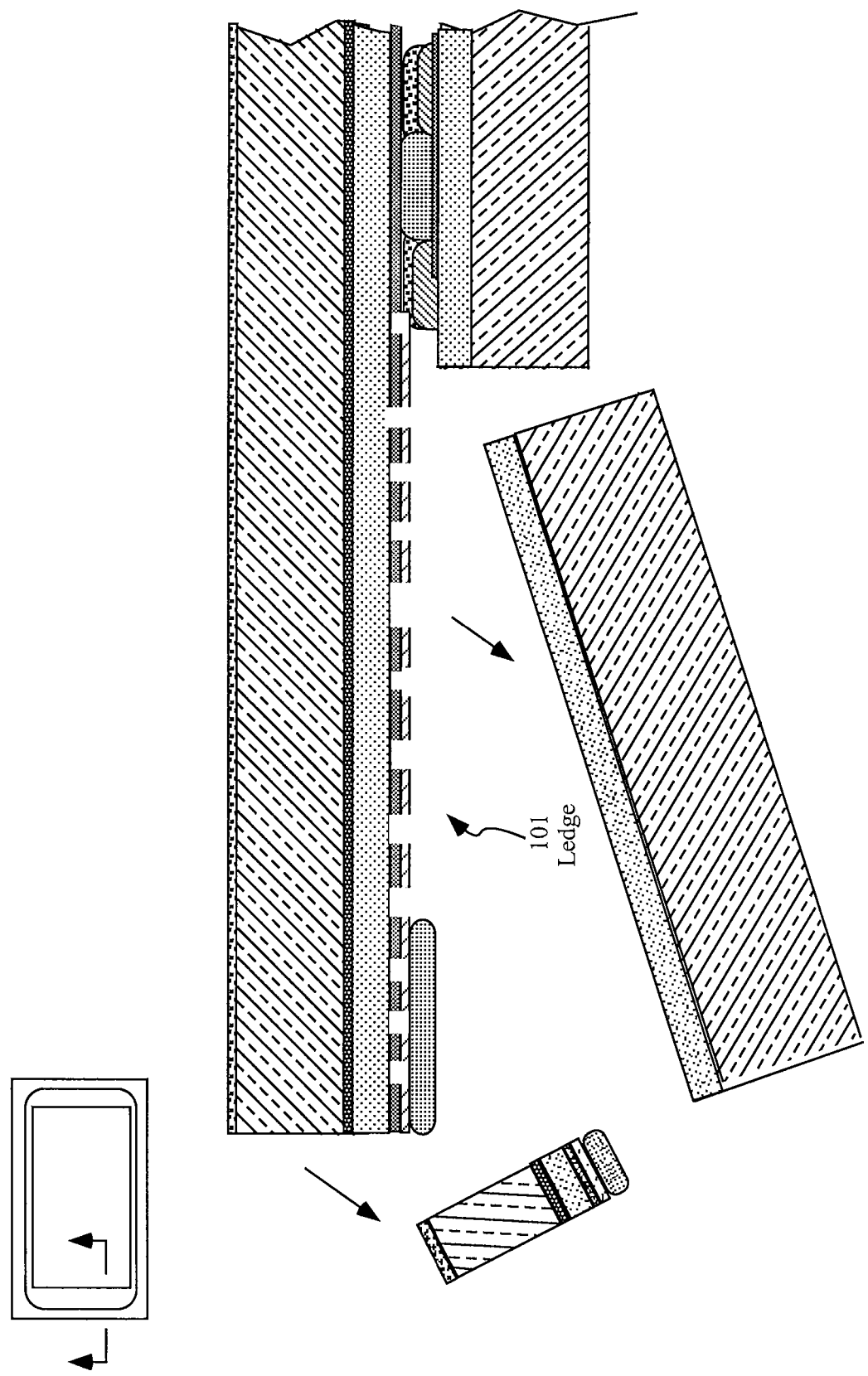
Figure 1H:
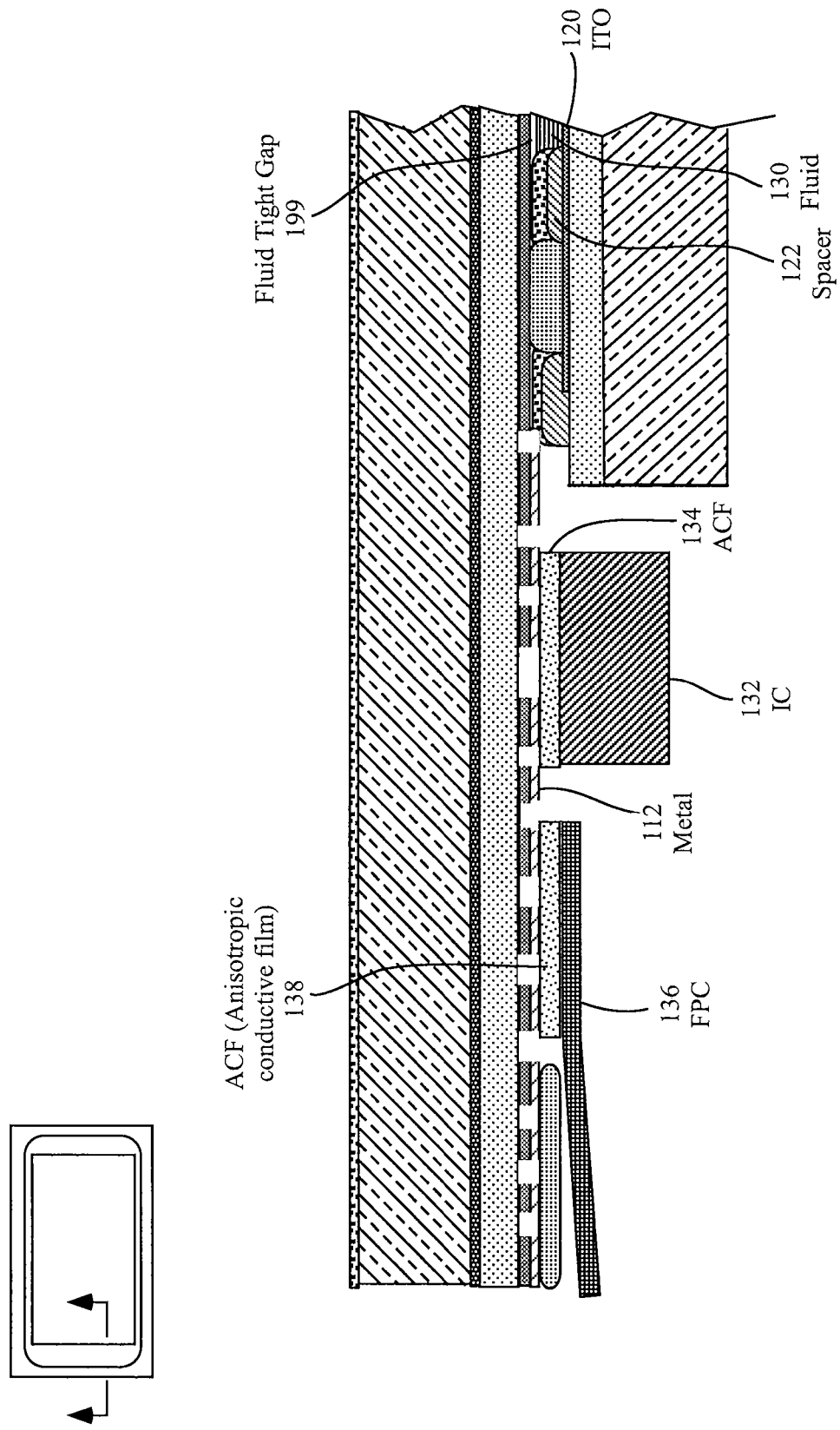
Figure 1I:
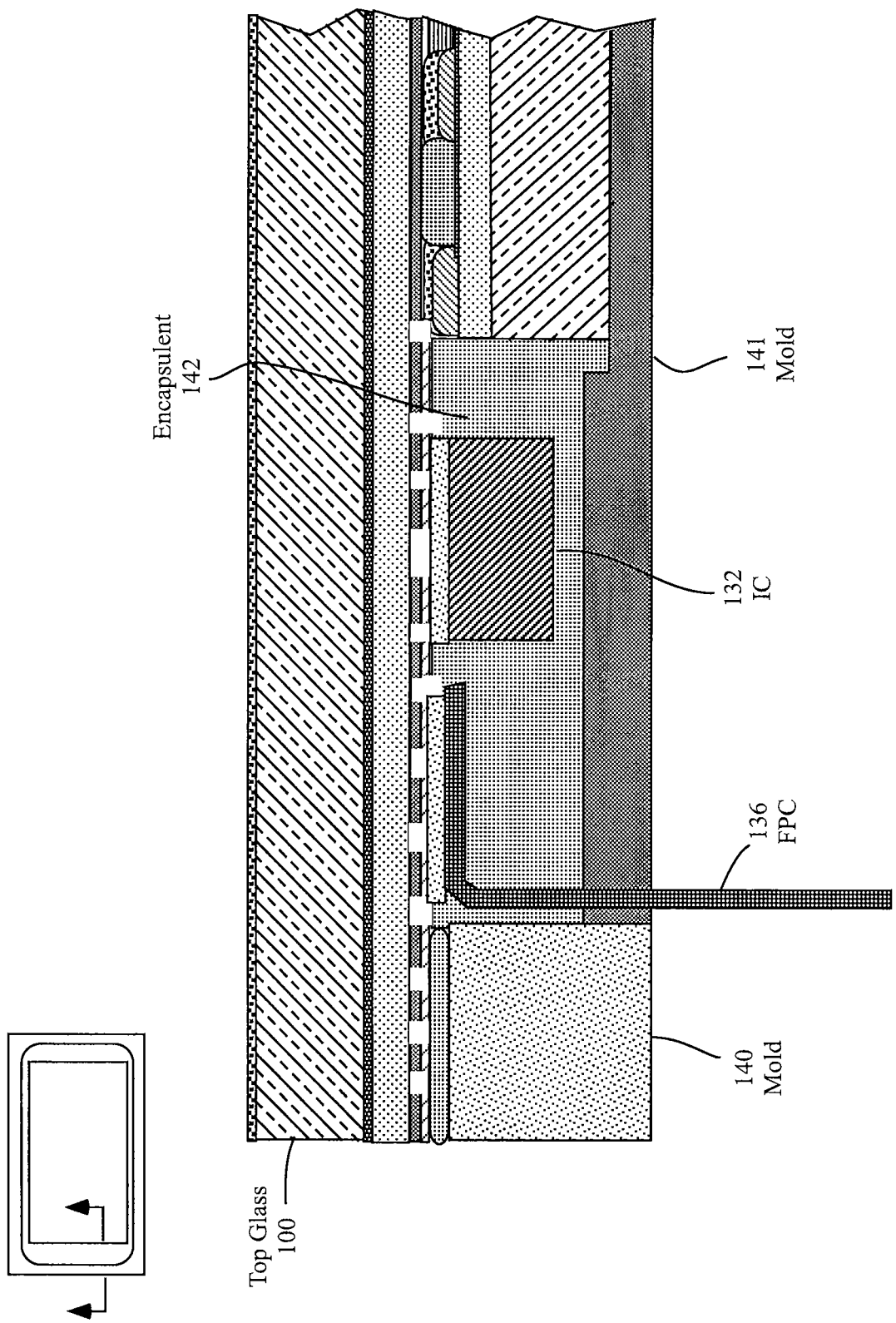
Figure 1J:
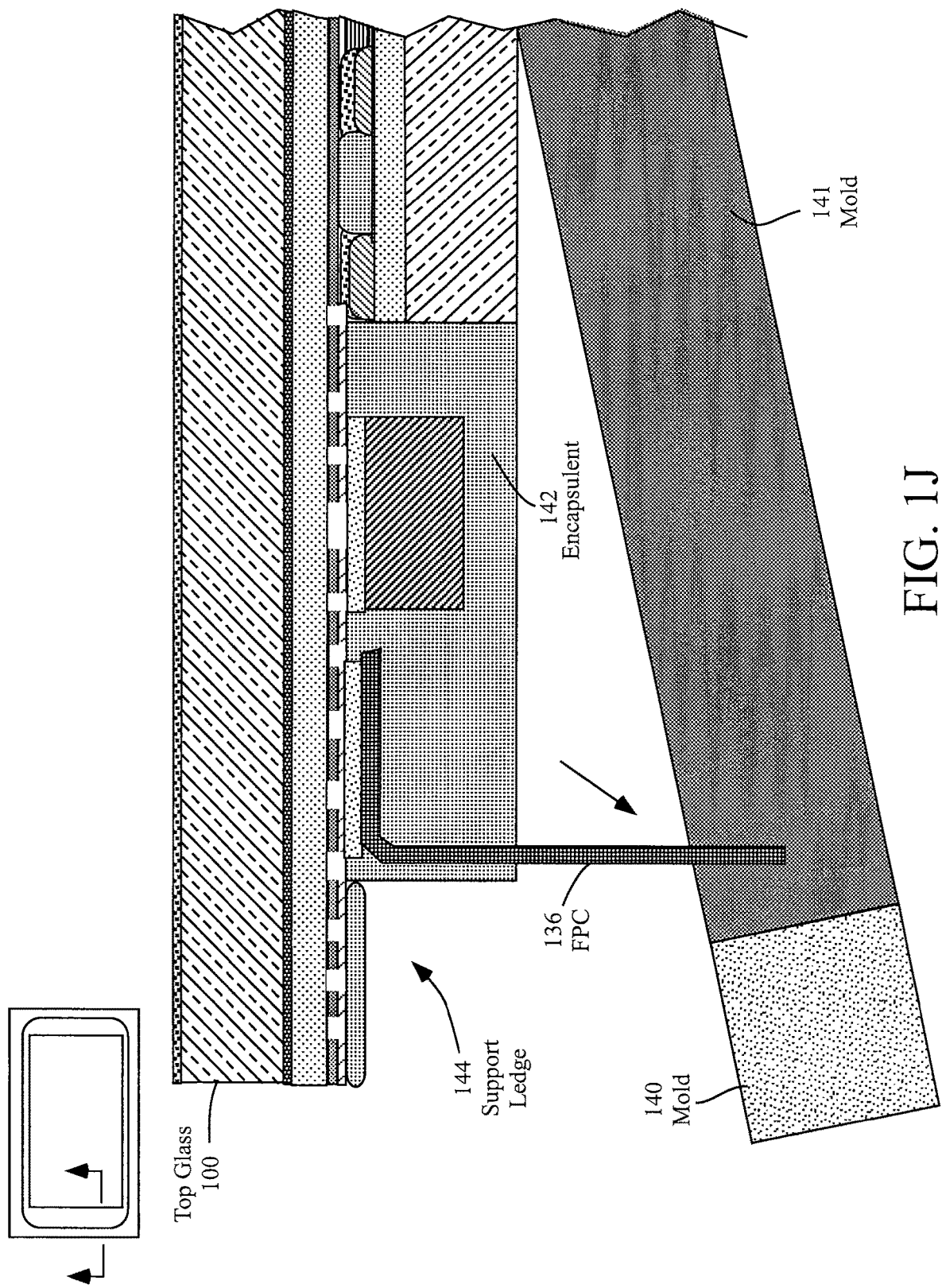
Figure 1K:
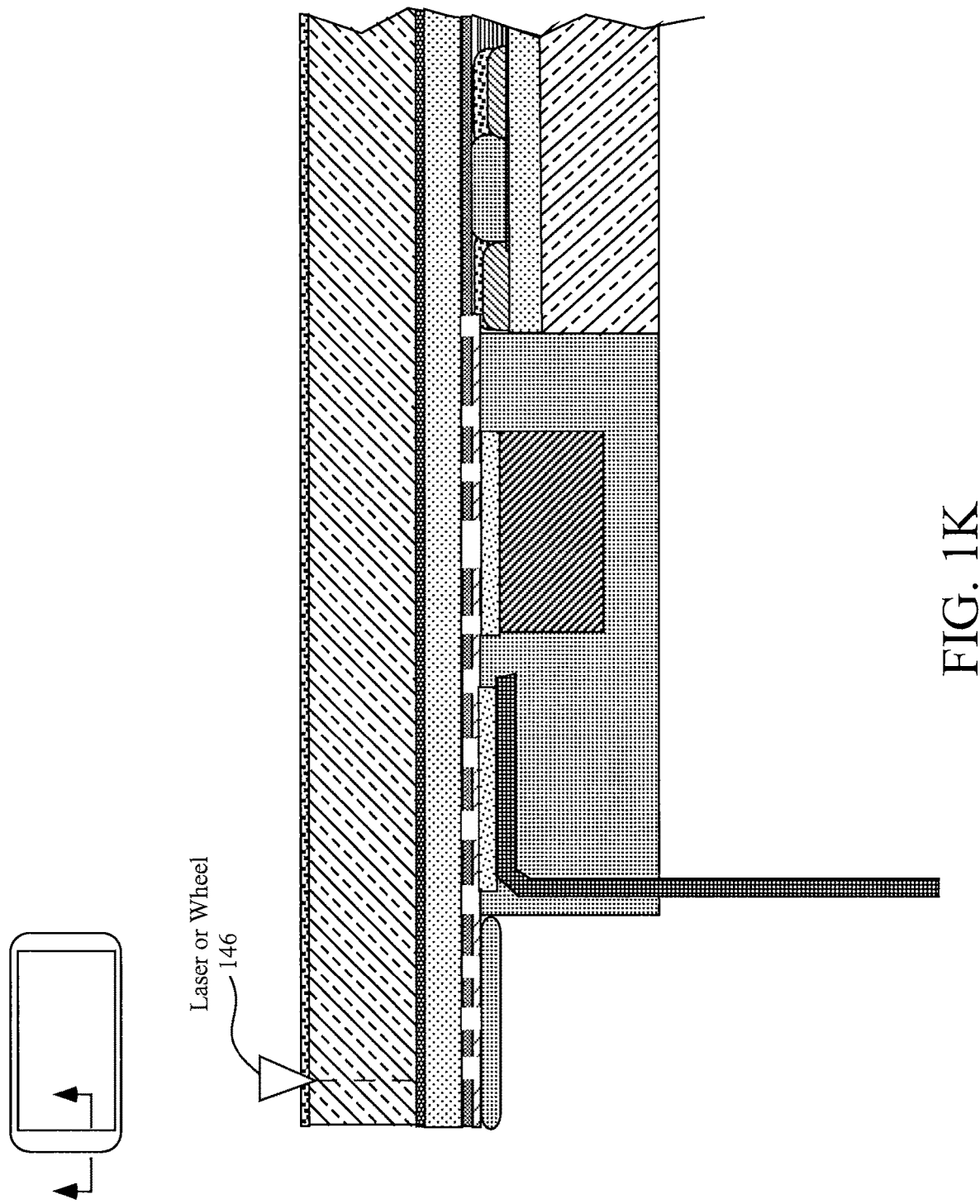
Figure 1L:
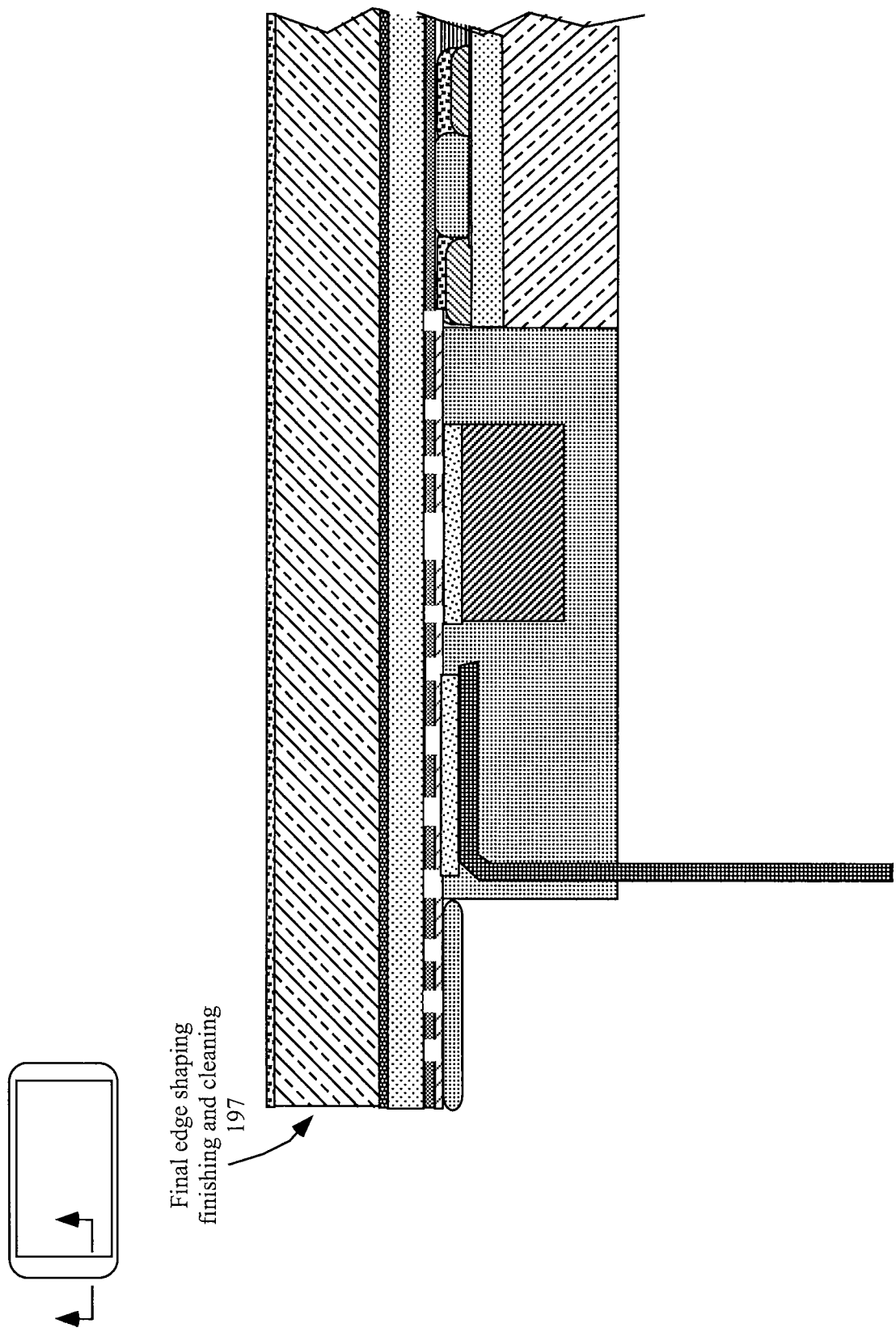
Figure 1M:
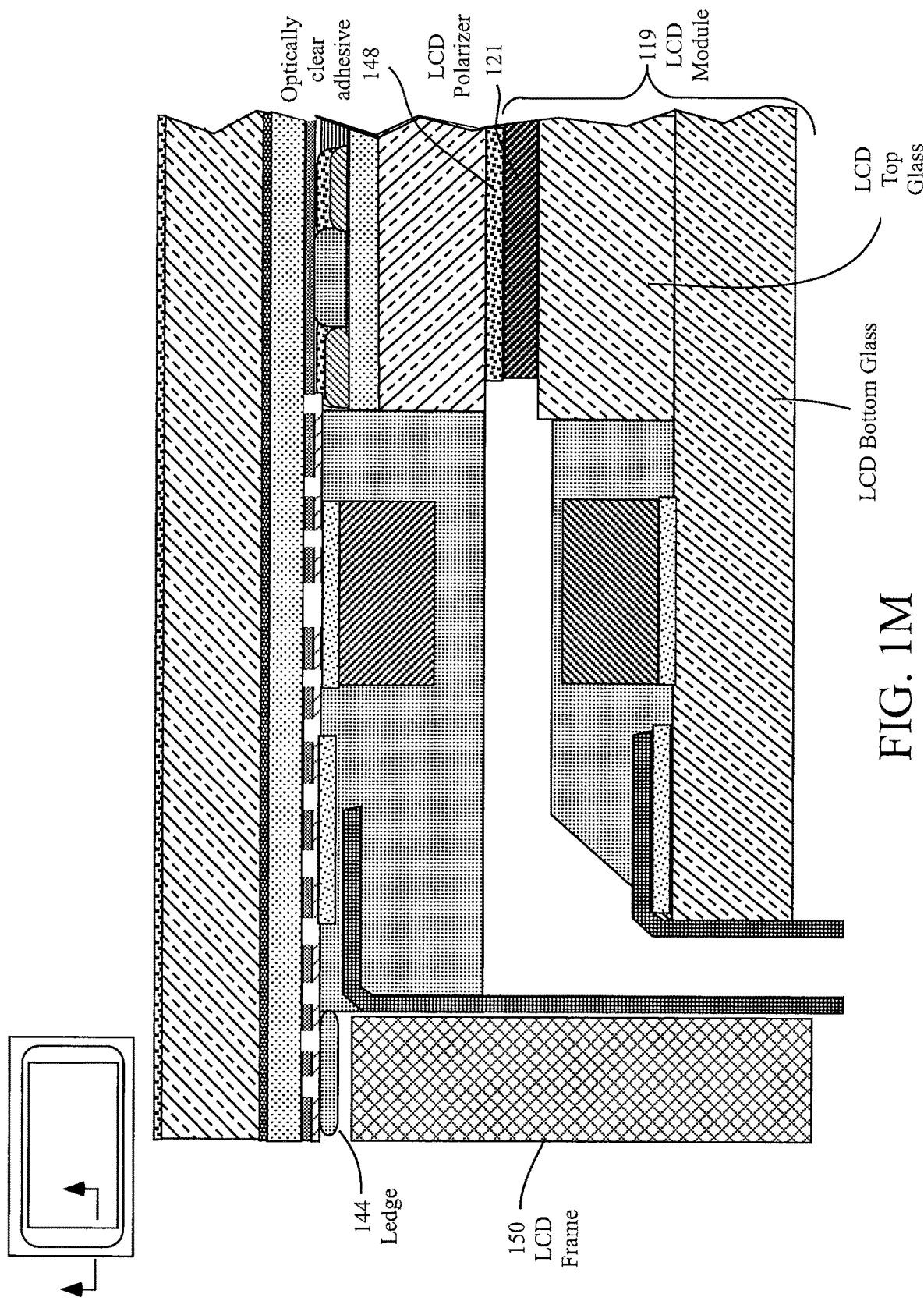
Figure 1N:
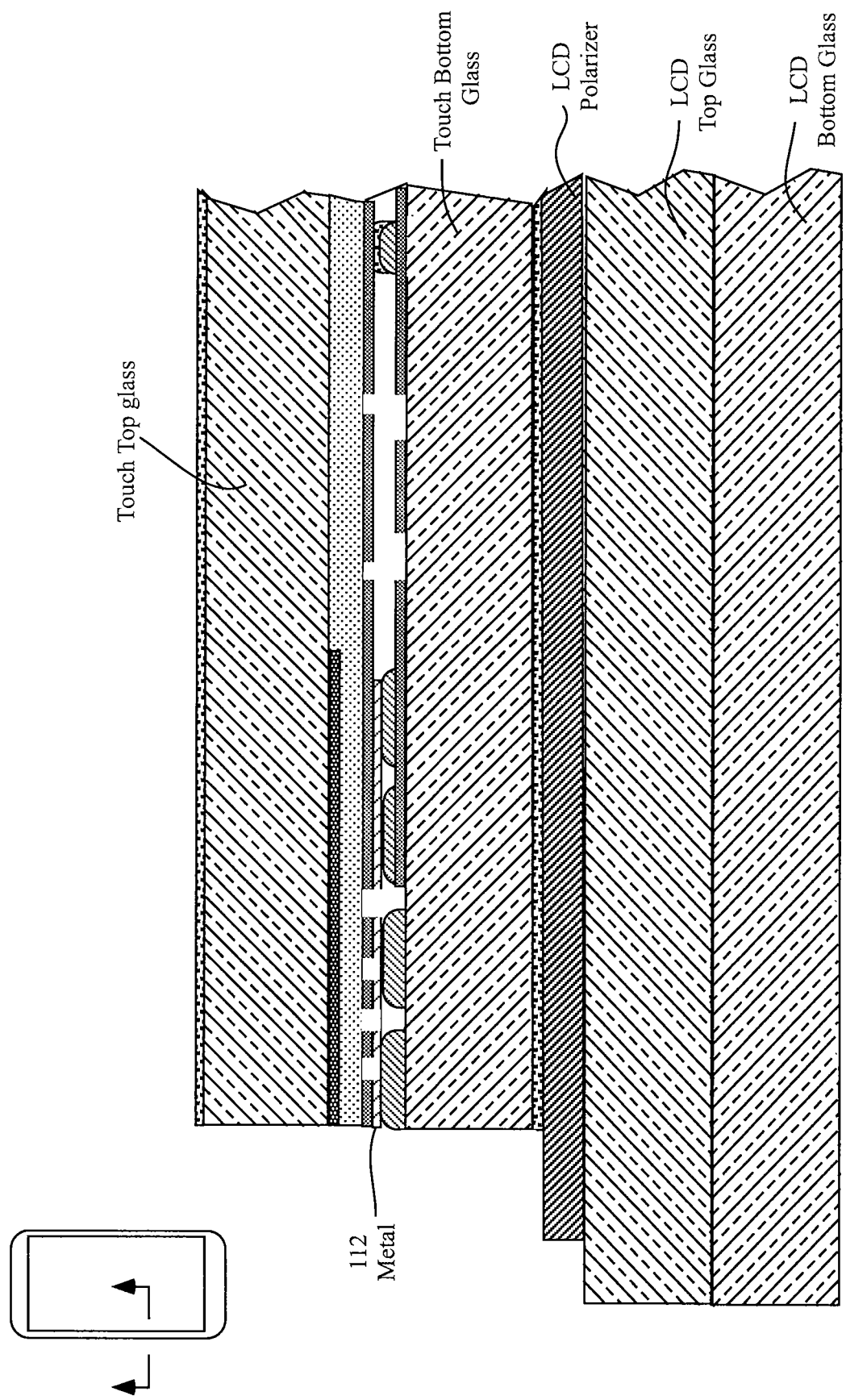

FIGS. 1a through 1n illustrate an exemplary first touchscreen that can be formed by combining an exemplary first upper layer subassembly, an exemplary first lower layer subassembly, and an exemplary LCD module according to one embodiment of this invention. The exemplary first touchscreen of FIGS. 1a-1n can also include force-sensitive touch screens.

FIGS. 1a through 1c illustrate an exemplary first upper layer subassembly for a touch sensor panel according to embodiments of the invention. FIG. 1a shows top glass or motherglass substrate 100, which can be a large sheet (e.g. 2×3 feet) from which a number of individual substrates can be generated. A chemical strengthening step can be performed on the top glass, which can involve applying a nitric acid bath at high heat to glass 100, resulting in compressive forces or stresses in the surface layer of the glass and tensile stresses in the interior core of the glass that can make the surface of the glass less likely to crack apart. Anti-glare coating 102 can then be deposited on glass 100. Anti-glare coating 102 can be particle-embedded silicon dioxide. Alternatively, anti-reflective (AR) coating, or a plain glass surface with no coating, can be used. Black mask 104 can be applied to border regions of glass 100. Black mask 104 can be applied using printing techniques, roller coating, or sputtering followed by etching of unwanted areas. Alternatively the black mask can be applied using spin coating or extrusion coating of photo-imagable black polymer, and selectively removed with photolithography (similar to the process to create black mask for LCD color filters). Note that FIG. 1a shows that black mask 104 has been applied in a border region, but has been stripped away in a clear center region. Next, clear overcoat 106 can be applied over black mask 104 and glass 100. Substantially clear overcoat 106 can be a clear polymer that can be curable with ultraviolet (UV) light. Substantially clear overcoat 106 can smooth over the step between the black mask and non-black mask areas, and can form a substantially planar surface for subsequent Indium Tin Oxide (ITO) sputtering and metal patterning. ITO 108 of 10 to 200 ohms per square (max) and an optical index of n=1.8 can then be sputtered over overcoat 106, although thicker layers of ITO can reduce this resistance and thinner layers can increase this resistance. The center region can be masked to protect the transparent center region from subsequent metal sputtering by photo-imaging or printing photoresist 110 with an overlap of about 100 microns±50 microns with respect to black mask 104 using silkscreen techniques. Metal 112 having a resistivity of 0.2 ohms per square can then be sputtered over ITO 108 and photoresist 110. Metal 112 can be a stack-up of different metals, such as aluminum (for high connectivity) and molybdenum (to prevent corrosion), copper, or a silver alloy.

FIG. 1b shows the step of removing photoresist 110 by peeling the photoresist off or submersing it into an acid that attacks the photoresist but not the metal. For each part, this step can form a metal ring around the transparent region of the touch screen.

FIG. 1c shows the patterning of metal 112 using photolithography that can form metal traces having 10 micron (minimum) widths and spaces along the borders of the touch screen, and then further patterning ITO 108 using photolithography to form row or column traces having 10 to 30 micron (minimum) widths and spaces. Border insulator 114 of 5 to 10 micron thickness can then be printed over ITO 108 to create a fluid-tight ring around each touch screen.

FIG. 1d illustrates an exemplary first lower layer subassembly according to embodiments of the invention. FIG. 1d shows bottom glass or motherglass substrate 116, which can be a large sheet (e.g. 2×3 feet), and from which a number of individual substrates can be generated. Substantially clear overcoat 118 of silicon dioxide or polymer can then be applied over bottom glass 116 to prepare the surface for ITO. This overcoat can be optional. ITO 120 having a resistivity of 10 to 200 ohms per square and an optical index of 1.8 can then be sputtered over clear overcoat 118. ITO 120 can then be patterned using photolithography. Spacers 122 of clear silicon ink having an optical index of 1.8, or an optical index substantially similar to the fluid that will be used, which provide a spacing between the top and bottom glass, can then be printed over ITO 120 and clear overcoat 118 and can be cured using ultraviolet (UV) light. In border areas (the left two spacers in FIG. 1d), the border spacers can be a solid pattern 12±2 microns in height, except for where via openings exist. In other areas, the spacers can be dots of 50±10 micron diameter 12±2 microns in height. If the touch screen is to include force sensing, spacers 122 can be made of a soft, elastic material such as clear, UV-cured silicon ink that has can have an optical index that matches that of ITO to minimize pattern visibility. If the touch screen does not include force sensing, the spacer dots can be made of a harder, inelastic material. Assembly adhesive 124 such as clear silicon ink having an optical index of 1.8 can then be printed onto spacer 122 using the same pattern as the spacers. Note that adhesive 124 is not immediately UV-cured so it can act as an adhesive. Conductive vias 126 having a diameter of 500 microns can then be deposited between the border spacers using a silk-screening process or a robot needle dispenser. Vias 126 can be made of conductive epoxy or ink and can provide electrical connections between the top and bottom glass. Vias 126 can allow the consolidation of all connections onto a single layer.

FIG. 1e shows the previously described first upper layer subassembly and the first lower layer subassembly bonded together with assembly adhesive 124 to form a first touch sensor panel assembly, with UV light 126 applied through the bottom glass to cure the assembly adhesive. A fluid-tight gap 199 is can be formed between the first upper layer subassembly and the first lower layer subassembly.

FIG. 1f shows the step of scribing, where laser or wheel 128 can be used to introduce stresses into the glass so that the motherglass can be broken into individual parts.

FIG. 1g shows the step of breaking away unwanted parts of the assembly at the scribe lines created by the stresses. The view shown is along the short edge of the exemplary first upper layer subassembly, as shown in the thumbnail. Note that the scribe lines are offset, so that when the unwanted parts are broken away, ledge 101 can be used for flex circuit connections.

FIG. 1h shows fluid-tight gaps 199 between the first upper and lower layer subassemblies that can be filled with clear optical fluid 130 having an optical index that can be similar to that of the ITO 120 and spacers 122 to make the ITO patterns and spacers substantially transparent. If force-sensing is not required, fluid 130 could instead be a liquid glue that can be curable with UV light to make a solid stackup. Fluid 130 can have dielectric properties which enable the row and column traces that can be formed in ITO layers 120 and 108 to experience a mutual capacitance between them at crossover points and act as touch sensors. If force-sensing is employed, the change in the distance between ITO layers 120 and 108 during a touch can change the mutual capacitance experienced by each of the touch sensors, effectively representing a measure of force. IC 132, which can have a height of 0.35 and a width of 1.5, can then be bonded to metal traces 112 on the top glass using anisotropic conductive film (ACF) 134. Flexible printed circuit (FPC) 136 (e.g. a 2-layer FPC) can also be bonded to metal traces 112 on the top glass using ACF 138.

Because the use of PSA to fully laminate the exemplary first upper and lower layer subassemblies together can cause bubbles to form in the PSA, thereby reducing the clarity of the touch sensor panel, in embodiments of the invention fluid 130 can be used in some areas instead of full lamination for the purpose of providing optical index matching with few or no bubbles.

FIG. 1*i* shows FPC 136 that can be folded away from the edge of top glass 100, and a temporary mold, which is indicated by reference numbers 140 and 141 in FIG. 1*i*, can be positioned to enable encapsulent 142 to be poured and retained by the mold (note that FIG. 1*i* is oriented up-side down relative to the time at which the encapsulent is poured). Encapsulation can provide a physically robust touch screen and locks FPC 136 and IC 132 into place.

FIG. 1*j* shows the step of removing temporary molds 140 and 141 after encapsulent 142 has cured, exposing support ledge 144 which can be 0.8 wide and useful for mounting the touch screen into a bezel of a product.

FIG. 1*k* shows the step of final outline cutting using laser or wheel 146 to create the final perimeter.

FIG. 1*l* shows the step of edge finishing at edge 197, where grinding and polishing can be used to create radii at the four corners for strength and safety.

FIG. 1*m* shows the first touch sensor panel assembly that can be bonded or laminated to LCD module 119 using optically substantially clear adhesive 148 to form the exemplary first touchscreen, where the LCD module can include LCD polarizer 121, LCD top glass, liquid crystal, and LCD bottom glass. LCD frame 150 can mount to ledge 144.

FIG. 1*n* shows a side detail of the exemplary first touchscreen, which can include metal traces 112 in the border areas. The view shown has now changed to along the long edge of the exemplary first touchscreen, as shown in the thumbnail.

Figure 2A:
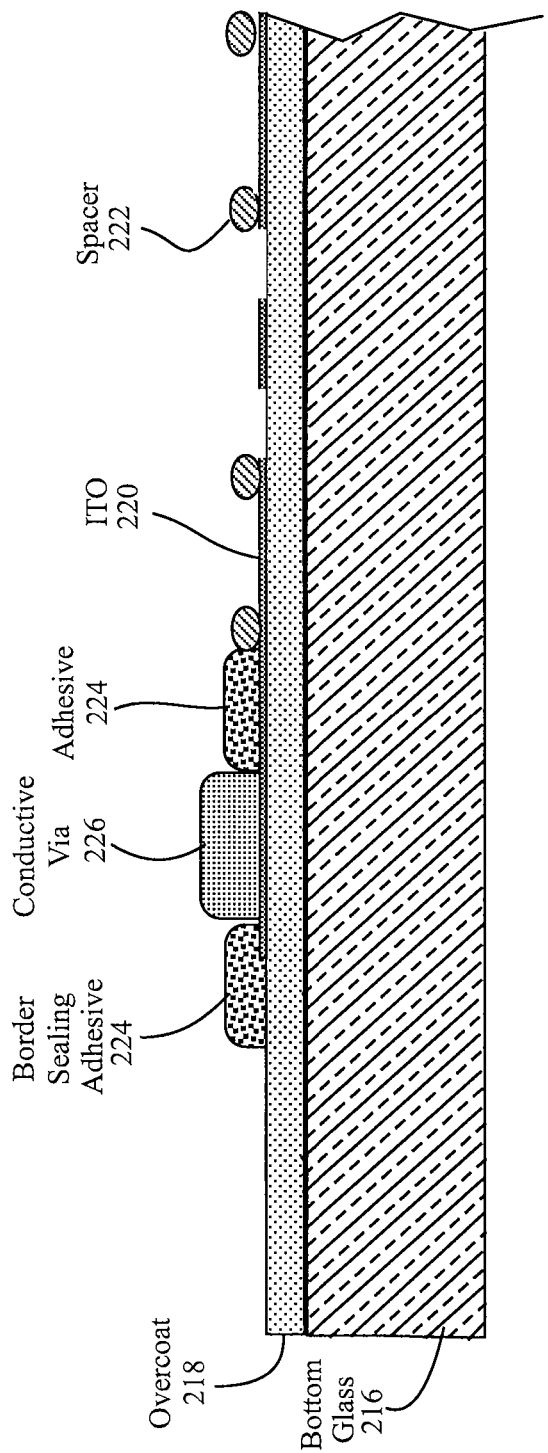
FIGS. 2a through 2c illustrate an exemplary second touchscreen that can be formed by combining the exemplary first upper layer subassembly, an exemplary second lower layer subassembly, and the exemplary LCD module according to one embodiment of this invention.
Figure 2B:
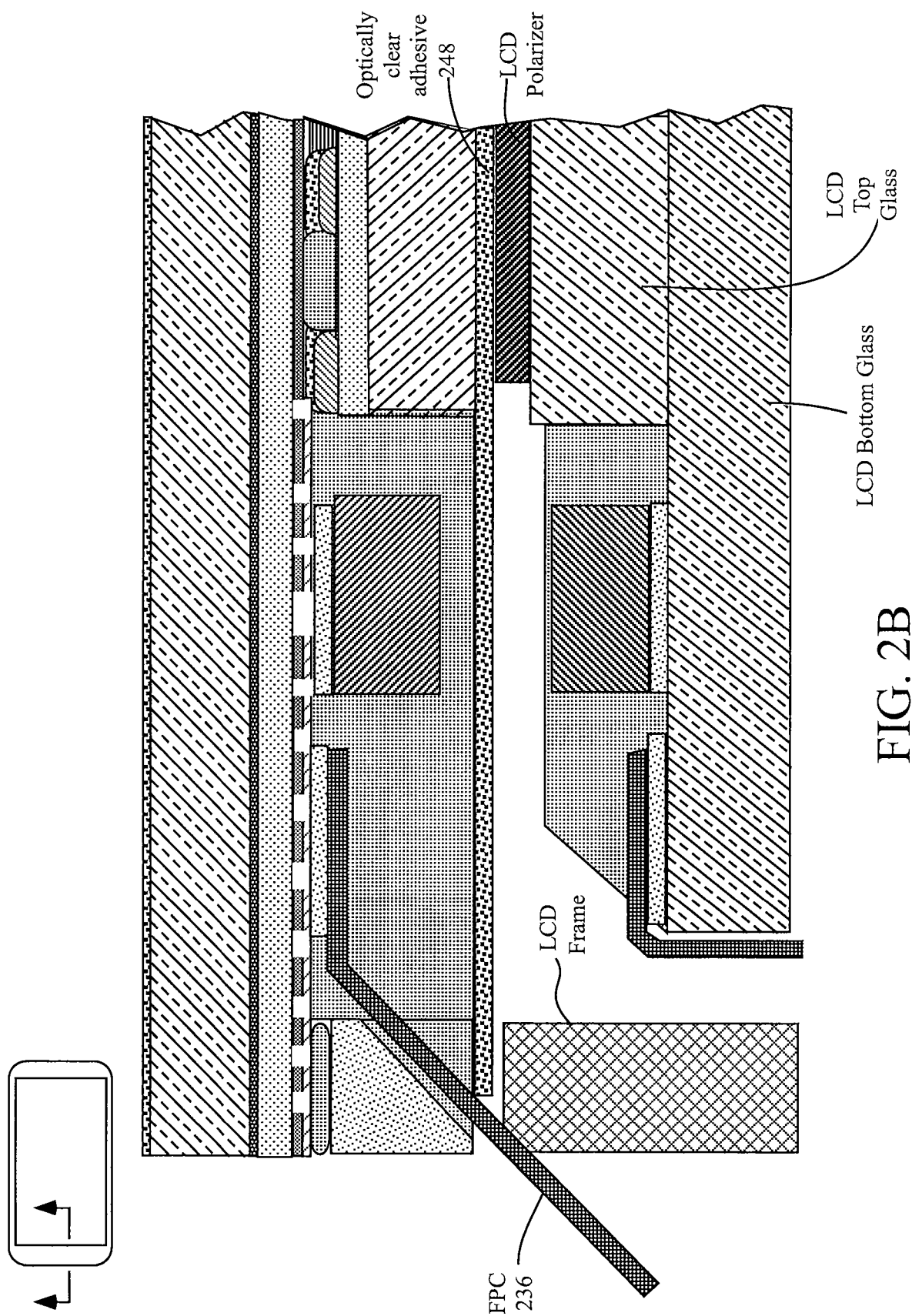
Figure 2C:
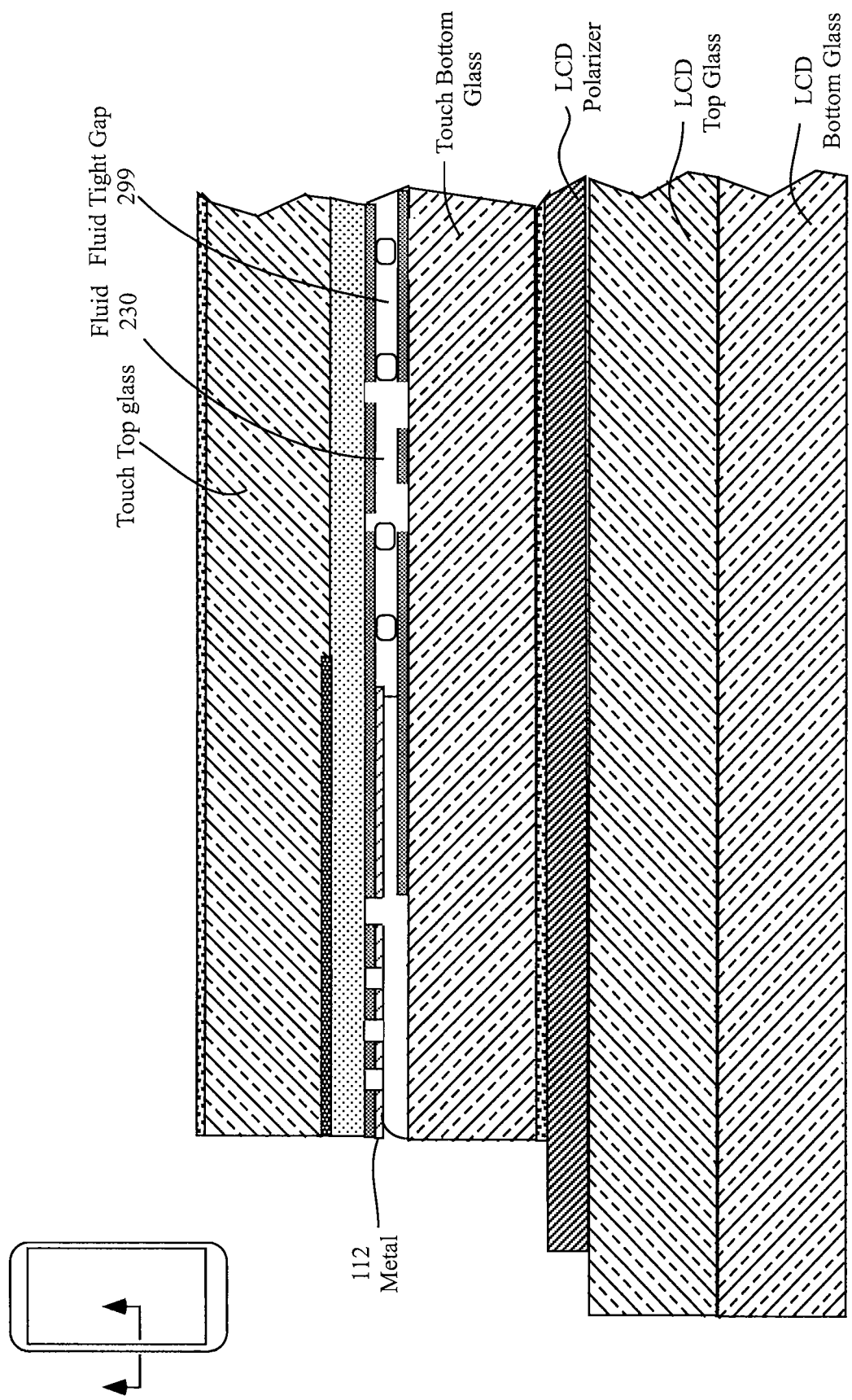

FIGS. 2*a* through 2*c* illustrate an exemplary second touchscreen that can be formed by combining the exemplary first upper layer subassembly, an exemplary second lower layer subassembly, and the exemplary LCD module according to one embodiment of this invention. The exemplary second touchscreen of FIGS. 2*a* through 2*c* can also include force-sensitive touch screens.

FIG. 2*a* illustrates the exemplary second lower layer subassembly according to embodiments of the invention. FIG. 2*a* shows bottom glass or motherglass 216, which can be a large sheet (e.g. 2×3 feet), and from which a number of individual substrates may be generated. Substantially clear overcoat 218 of silicon dioxide or polymer can then be applied over bottom glass 216 to prepare the surface for ITO. ITO 220 having a resistivity of 10 ohms per square and an optical index of 1.8 can then be sputtered over clear overcoat 218. ITO 220 can then be patterned using photolithography. Compressible spacers or spheres 222 of 10±2 micron height can then be sprayed on. Spacers 200 can have a compression of 2 microns when the total assembly can be loaded with 100 grams and can have an optical index that matches the ITO and/or fluid around them. Unlike the exemplary first lower layer subassembly, no border spacers are used, and instead border sealing adhesive 224 can then be printed. Note that adhesive 224 is not immediately UV-cured so it can be used as an adhesive. Conductive vias 226 that can have a diameter of 500 microns and a resistivity of 10 ohms maximum can then be deposited between border sealing adhesive 224 using a silk-screening process or a robot needle dispenser. Vias 226 can be made of conductive epoxy or ink and can provide electrical connections between the top and bottom glass. Vias 226 can also allow the consolidation of all connections onto a single layer.

The first exemplary upper layer subassembly and the second exemplary lower layer subassembly can then be bonded together, and scribed and cut to remove excess material. An IC and/or FPC can then be bonded to the first exemplary upper layer subassembly, encapsulated, scribed and cut again to remove further excess material, and edge finished to form an exemplary second touch sensor panel assembly. The exemplary second touch sensor panel assembly can then be laminated to an LCD module. All of these steps can be performed as described above with regard to the exemplary first touchscreen.

FIG. 2*b* shows the exemplary second touch panel assembly that can be laminated to an LCD module with substantially optically clear adhesive 248 to form the exemplary second touchscreen. The view shown is along the short edge of the second exemplary touchscreen, as shown in the thumbnail. Note that FPC 236 was folded back at an angle prior to encapsulation in this embodiment.

FIG. 2*c* shows a side detail of the exemplary second touchscreen assembly, including metal traces 212 in the border areas. Note fluid 230 in fluid-tight gap 299. The view has changed to along the long edge of the second exemplary touchscreen, as shown in the thumbnail.

FIGS. 3*a* through 3*e* illustrate an exemplary third touchscreen that can be formed by combining the exemplary first upper layer subassembly, an exemplary third lower layer subassembly, and the exemplary LCD module according to one embodiment of this invention. The exemplary third touchscreen of FIGS. 3*a* through 3*e* can also include force-sensitive touch screens.

Figure 3A:
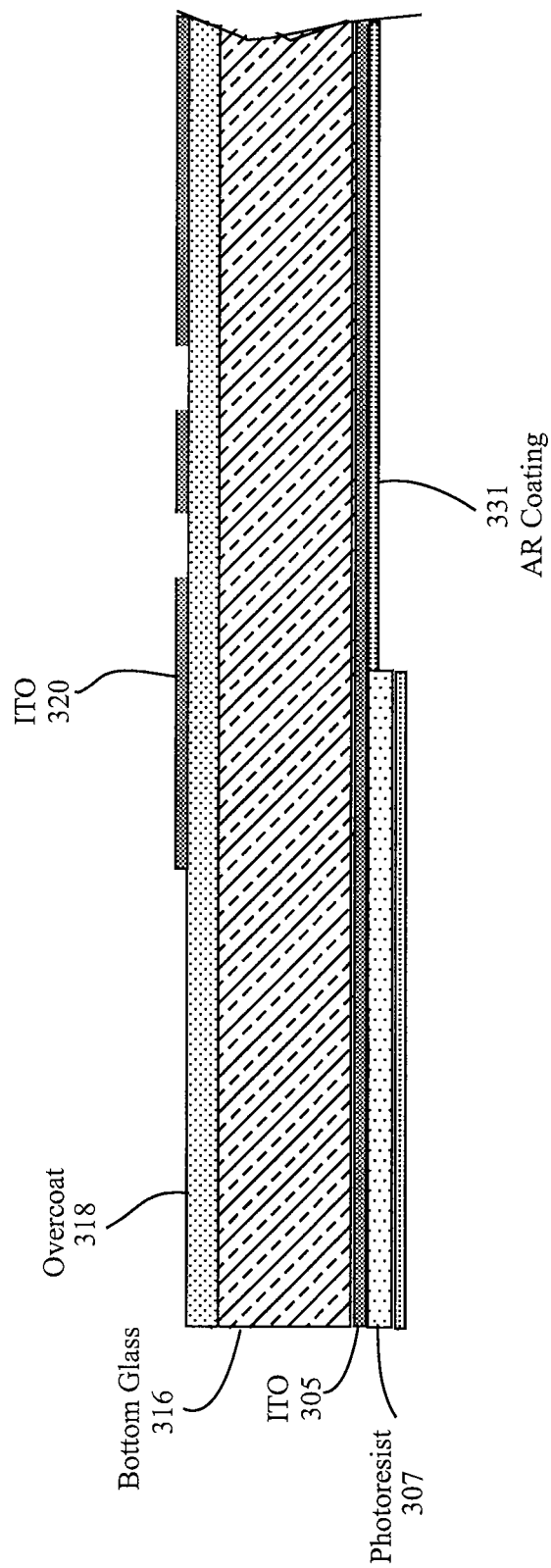
FIGS. 3a through 3e illustrate an exemplary third touchscreen that can be formed by combining the exemplary first upper layer subassembly, an exemplary third lower layer subassembly, and the exemplary LCD module according to one embodiment of this invention.
Figure 3B:
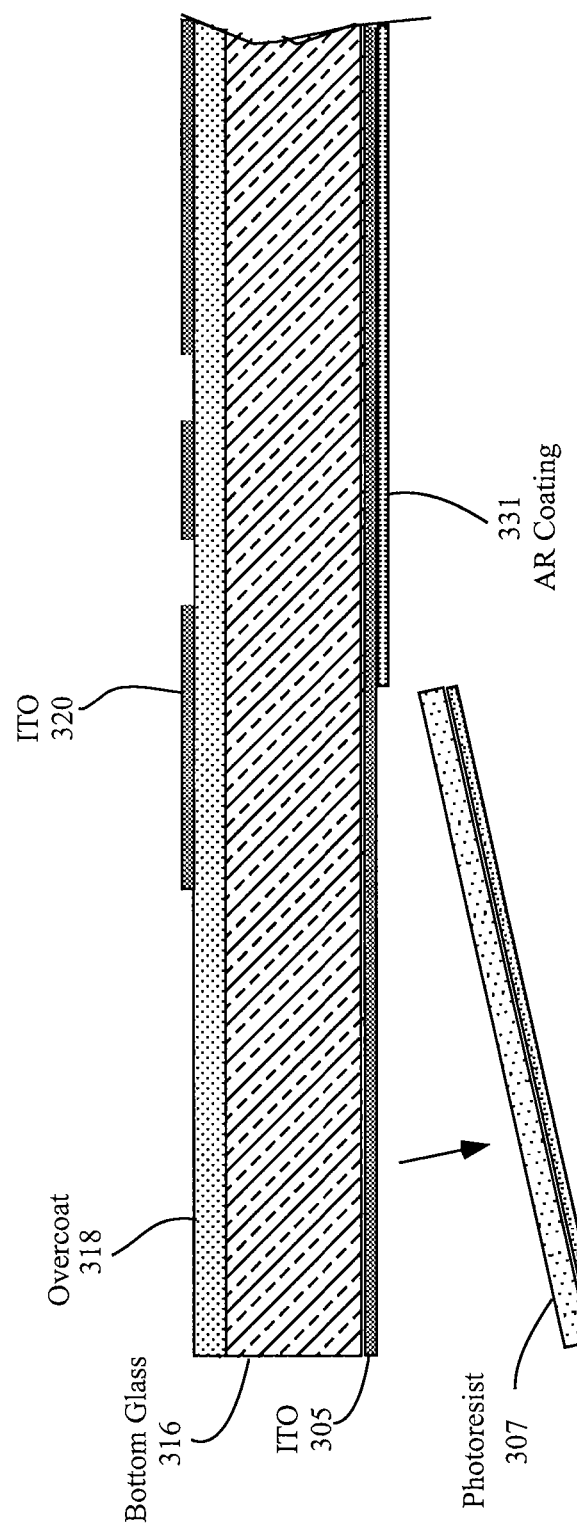
Figure 3C:
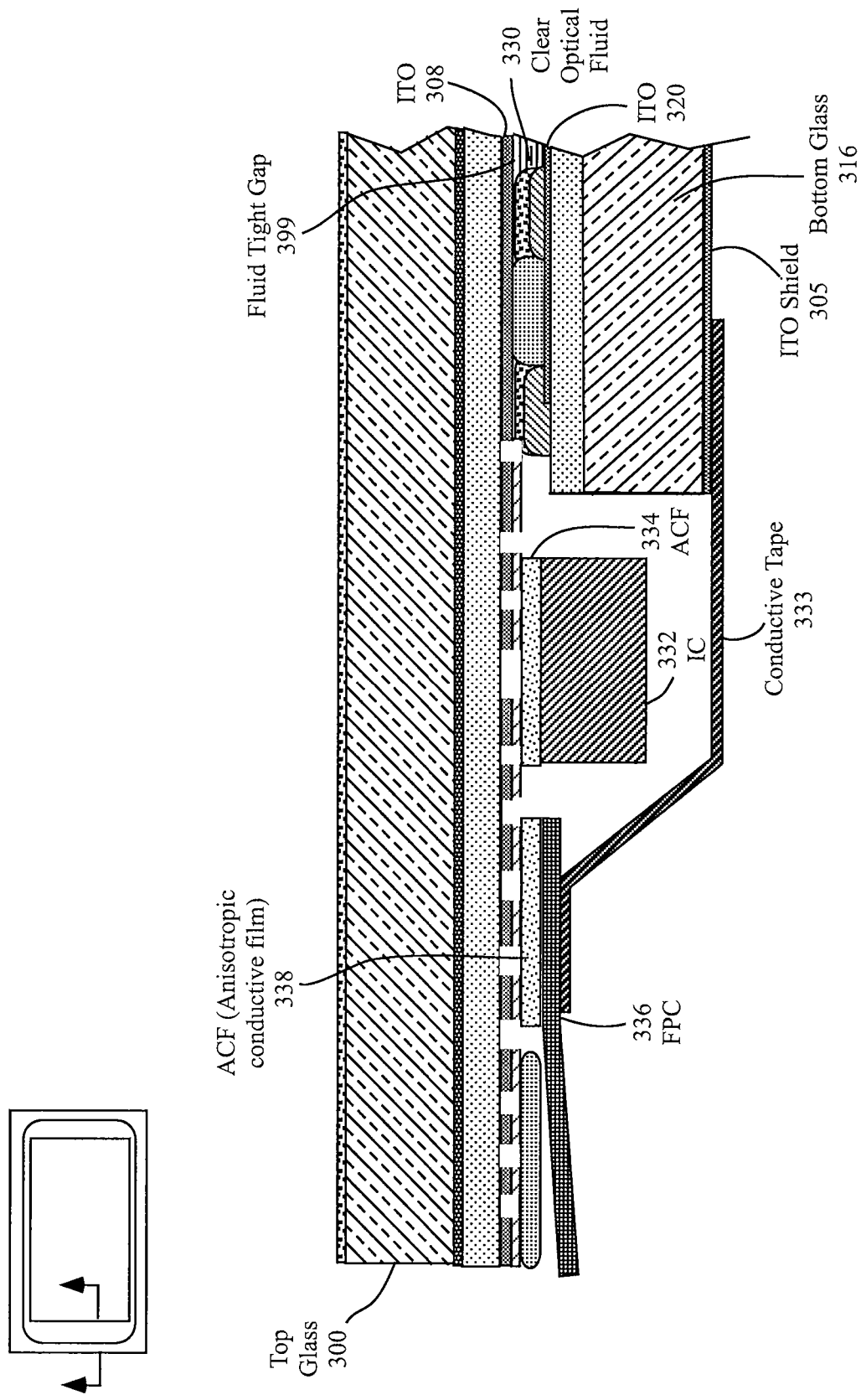

FIGS. 3*a* through 3*c* illustrate the exemplary third lower layer subassembly according to embodiments of the invention. FIG. 3*a* shows bottom glass or motherglass 316, which can be a large sheet (e.g. 2×3 feet), and from which a number of individual substrates may be generated. Substantially clear overcoat 318 of silicon dioxide or polymer can then be applied over bottom glass 316 to prepare the surface for ITO. ITO 320 having a resistivity of 10 ohms per square and an optical index of 1.8 can then be sputtered over clear overcoat 318. ITO 320 can then be patterned using photolithography. A bottom shield of ITO 305 at a thickness of 100 to 1000 ohms per square, for example, can be applied to the bottom of bottom glass 316 to prevent LCD noise from corrupting the sensor panel. A mask of photoresist 307 can then be applied over bottom shield 300 to protect border areas of the touch screen from anti-reflective (AR) coating. AR coating 331 having an optical index that can be matched to that of the lamination adhesive or air, depending on the final attachment method to the LCD, can then be applied over photoresist 307 and bottom shield 305.

FIG. 3*b* shows the step of removing mask 307 and exposing shield 305 so that conductive tape can be subsequently be adhered to the shield layer. Spacers, border sealing adhesive, and conductive vias can then be applied to the exemplary third lower layer subassembly. The exemplary first upper layer subassembly and the exemplary third lower layer subassembly can then be bonded together, and scribed and cut to remove excess material.

FIG. 3*c* shows the exemplary first upper layer subassembly and the exemplary third lower layer subassembly that can be bonded together to form an exemplary third touch sensor panel assembly. The view shown is along the short edge of the exemplary third touch sensor panel assembly, as shown in the thumbnail. Clear optical fluid 330 can be used to fill in the fluid-tight gap 399 between the top and bottom layer sub assemblies. Fluid 330 can have dielectric properties which can enable the row and column traces formed in ITO layers 320 and 308 to experience a mutual capacitance between them at crossover points and act as touch sensors. If force-sensing is employed, the change in the distance between ITO layers 320 and 308 during a touch can change the mutual capacitance experienced by each of the touch sensors, effectively representing a measure of force. IC 332 and FPC 336 can then be bonded to the first exemplary upper layer subassembly, and conductive tape 333 can be adhered to shield 305 and FPC 336 to ground the bottom shield 305 to FPC 306. IC 332, FPC 336 and conductive tape 333 can then be encapsulated, and the exemplary first upper layer subassembly can then be scribed and cut again to remove further excess material, and can be edge finished to form the exemplary third touch sensor panel assembly. The exemplary third touch sensor panel assembly can then be laminated to the exemplary LCD module. All of these steps can be performed as described above.

FIG. 3*ab* shows the exemplary third sensor panel assembly that can be laminated to the exemplary LCD module to form the exemplary third touchscreen. Note that FPC 336 was folded back at an angle in this embodiment.

Figure 3D:
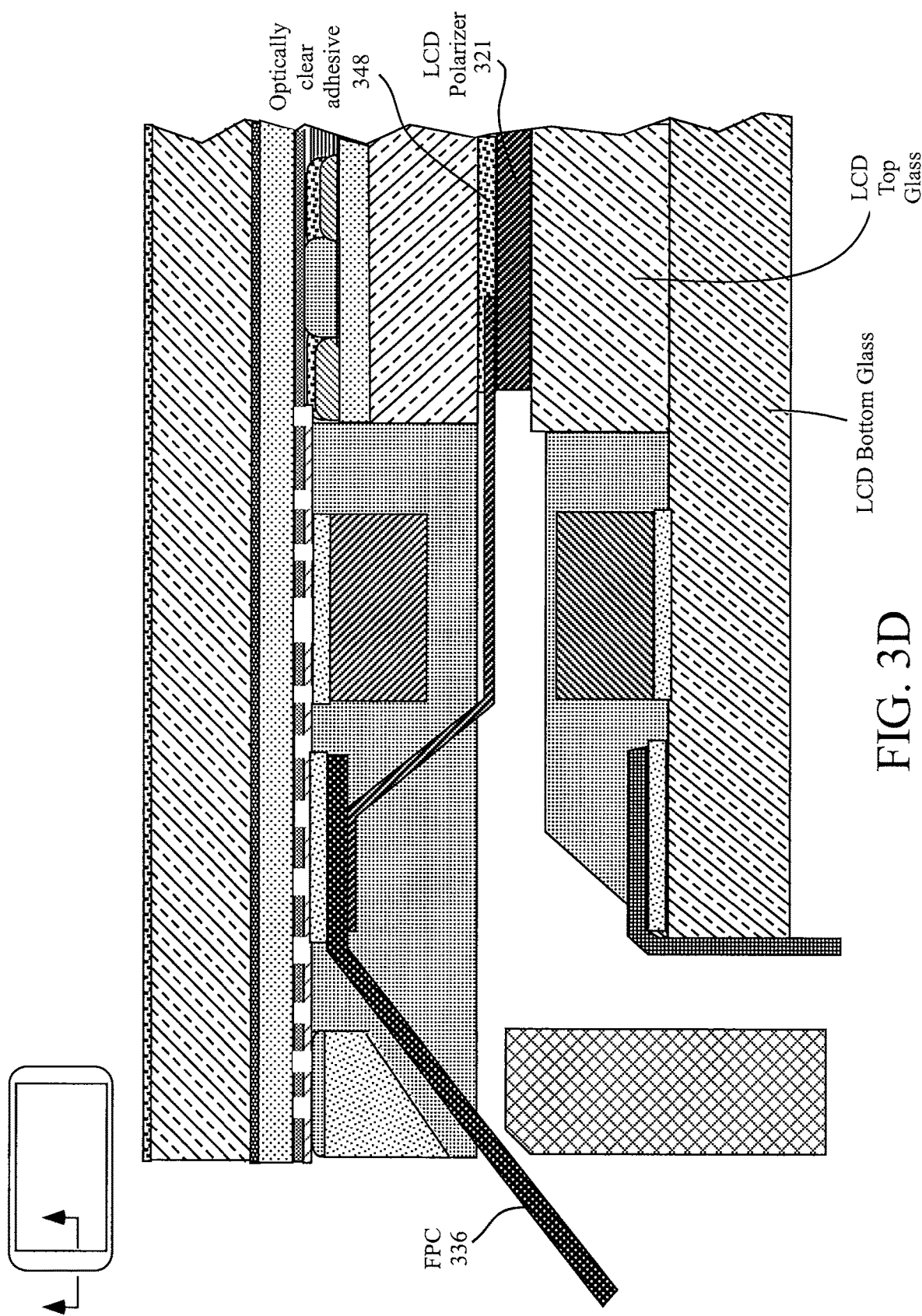
Figure 3E:
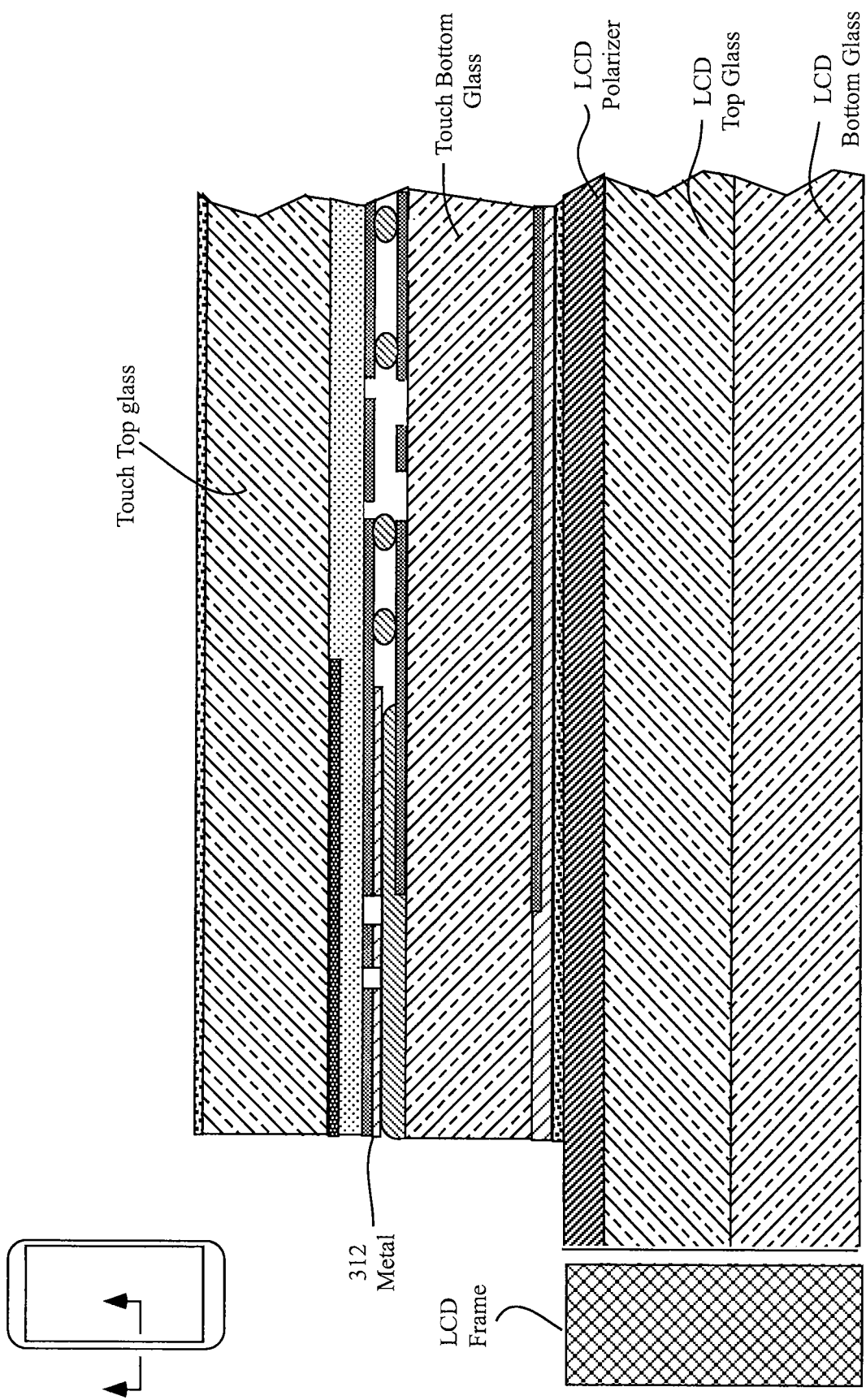

FIG. 3*d* shows a side detail of the exemplary third touchscreen, including metal traces 312 in the border areas. The view has changed to along the long edge of the third exemplary touchscreen, as shown in the thumbnail.

FIGS. 4*a* through 4*j* illustrate an exemplary fourth touchscreen that can be formed by an exemplary second upper layer subassembly and the exemplary LCD module according to one embodiment of this invention.

Figure 4A:
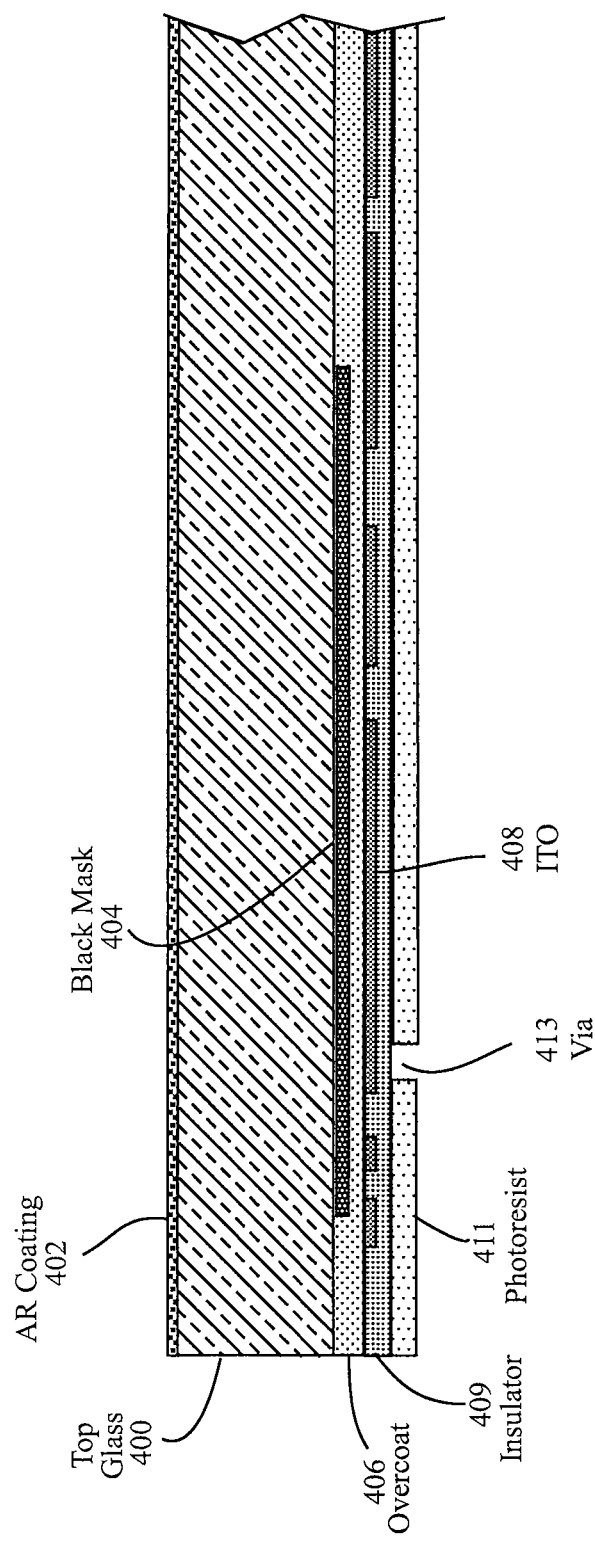

FIGS. 4*a* through 4*h* illustrate the exemplary second upper layer subassembly according to embodiments of the invention. FIG. 4*a* shows top glass or motherglass 400, which can be a large sheet (e.g. 2×3 feet), and from which a number of individual substrates may be generated. A chemical strengthening step can be performed on the top glass, which can involve applying a nitric acid bath at high heat to glass 400, resulting in compressive forces or stresses in the surface layer of the glass and tensile stresses in the interior core of the glass that can make the surface of the glass less likely to crack apart. Anti-glare coating 402 can then be deposited on glass 400. Anti-glare coating 402 can be particle-embedded silicon dioxide. Alternatively, AR coating or no coating can also be used. Black mask 404 can be applied to selected regions of glass 400. Black mask 404 can be applied using printing techniques, roller coating, or sputtering followed by etching of unwanted areas, or by using photoimagable polymer. Or photoimagable polymer. Next, clear overcoat 406 can be applied over black mask 404 and glass 400. Clear overcoat 406 can be a clear polymer curable with ultraviolet (UV) light that smoothes over the step between the black mask and non-black mask areas, and can form a substantially planar surface for subsequent Indium Tin Oxide (ITO) sputtering and metal patterning. ITO 408 of 10 to 200 ohms per square (max) and an optical index of n=1.8 can then be sputtered over clear overcoat 406, although thicker layers of ITO can reduce this resistance and thinner layers can increase this resistance. ITO 408 can then be patterned. Insulator 409 can then be applied over patterned ITO 408. Insulator 409 can have a dielectric constant K<4.0 and a thickness of between 10 and 25 microns. Insulator 409 can be applied so that a second layer of ITO can be added. Photoresist 411 can then be applied to insulator 409 and patterned for subsequent formation of vias 413.

Figure 4B:
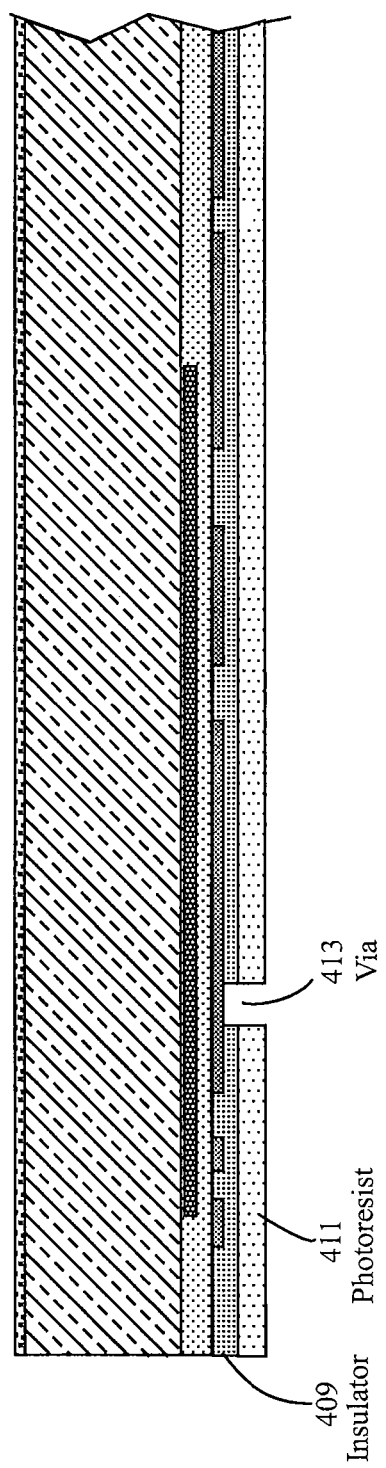

FIG. 4*b* shows the etching of insulator 409 using vias 413 in photoresist 411.

Figure 4C:
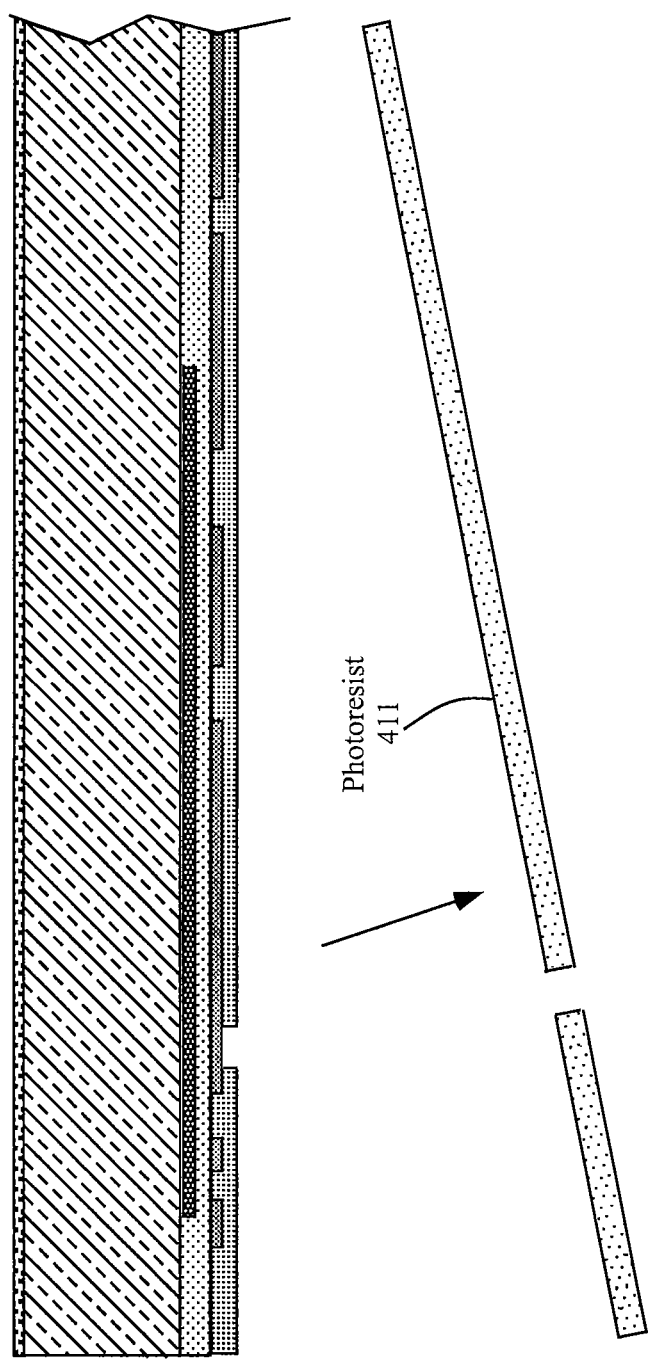

FIG. 4*c* shows the step of removing photoresist 411.

Figure 4D:
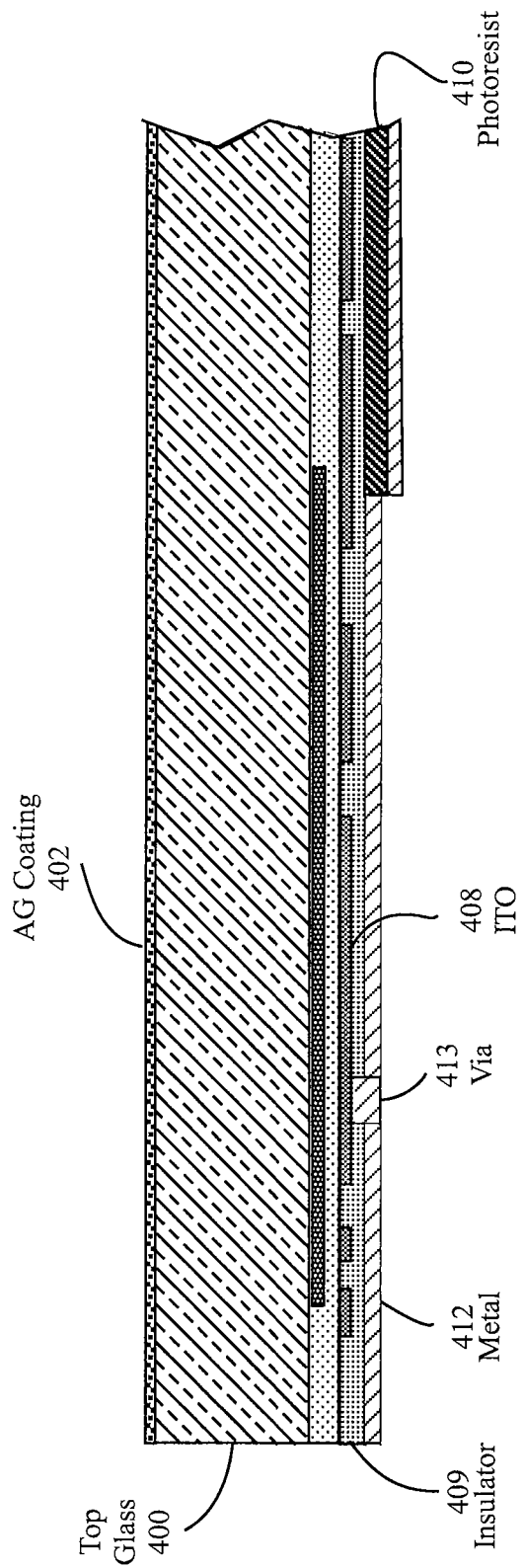

FIG. 4*d* shows the masking of the center region using photoresist 410 to protect it from metal sputtering, and the sputtering of metal 412 over insulator 409 and photoresist 410, and into via 413 for connecting to traces in first ITO layer 408.

Figure 4E:
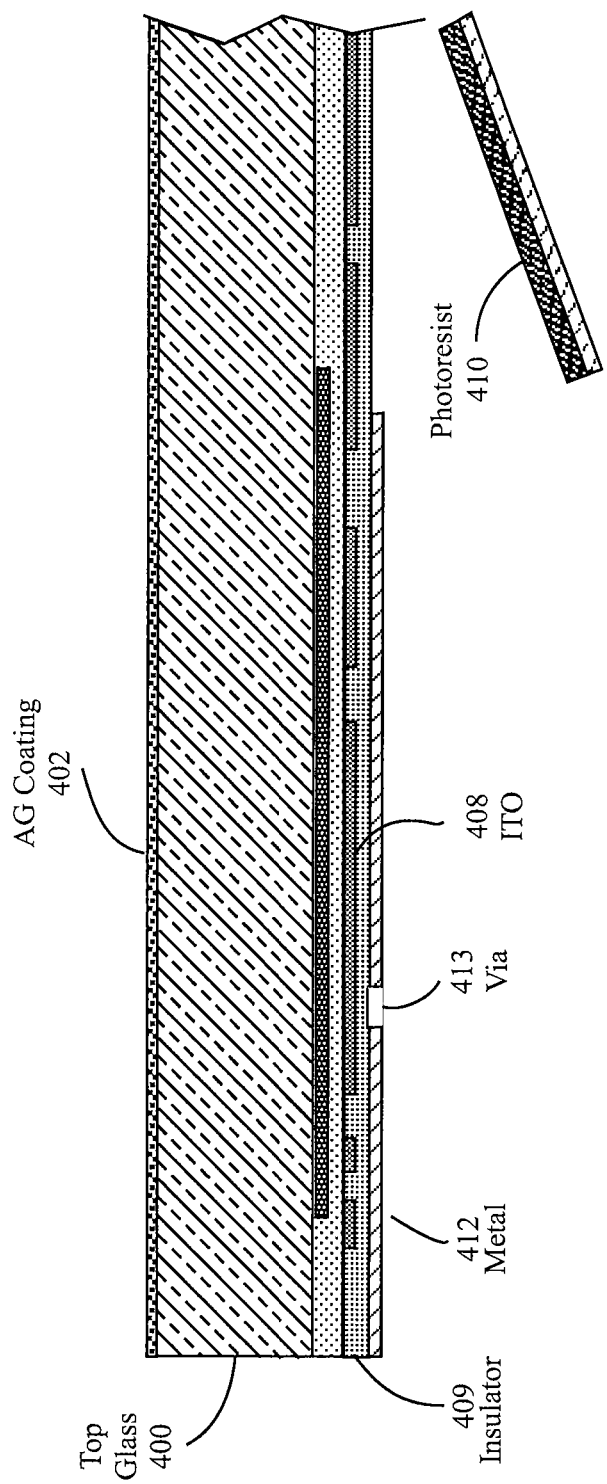

FIG. 4*e* shows the removal of photoresist 410.

Figure 4F:
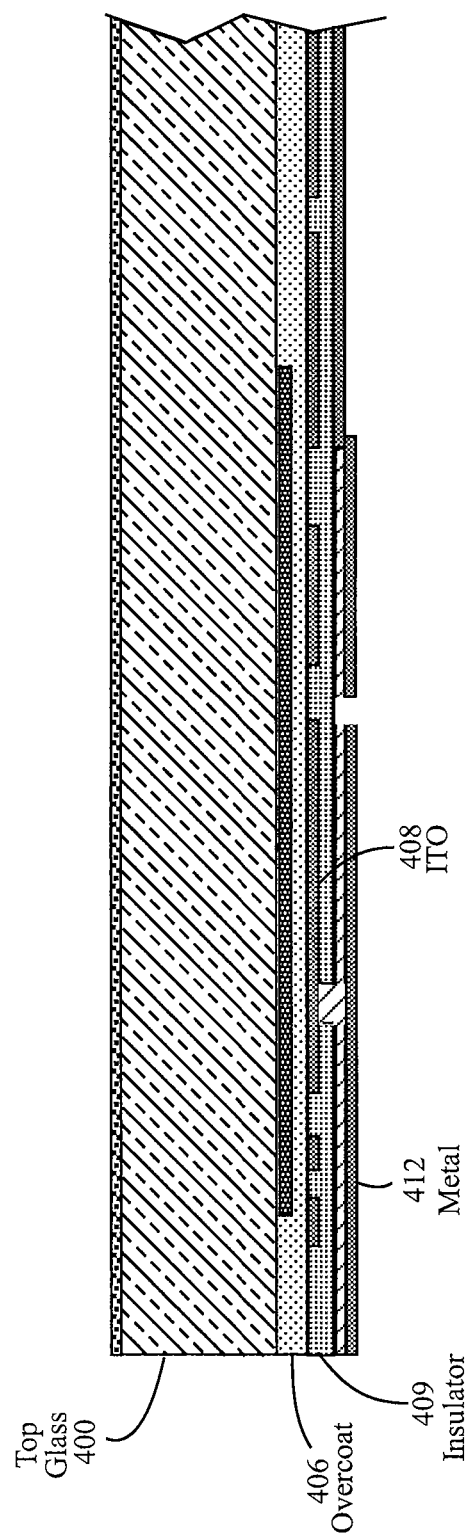

FIG. 4*f* shows the sputtering a second ITO layer 415 of 10 ohms per square and an optical index of 1.8 over metal 412 and insulator 409, and the patterning of the second ITO layer 415 and metal 412 using standard lithography processes to create row or column traces. The simultaneous patterning of the metal and the ITO layer can be done with a photoresist, a single photo-exposure and one or two etching steps (ITO and metal have different ideal etchants). Insulator 409 can have dielectric properties which enable the row and column traces formed in ITO layers 415 and 408 to experience a mutual capacitance between them at crossover points and act as touch sensors. Top glass 400 can then be scribed and separated into individual parts.

Figure 4G:
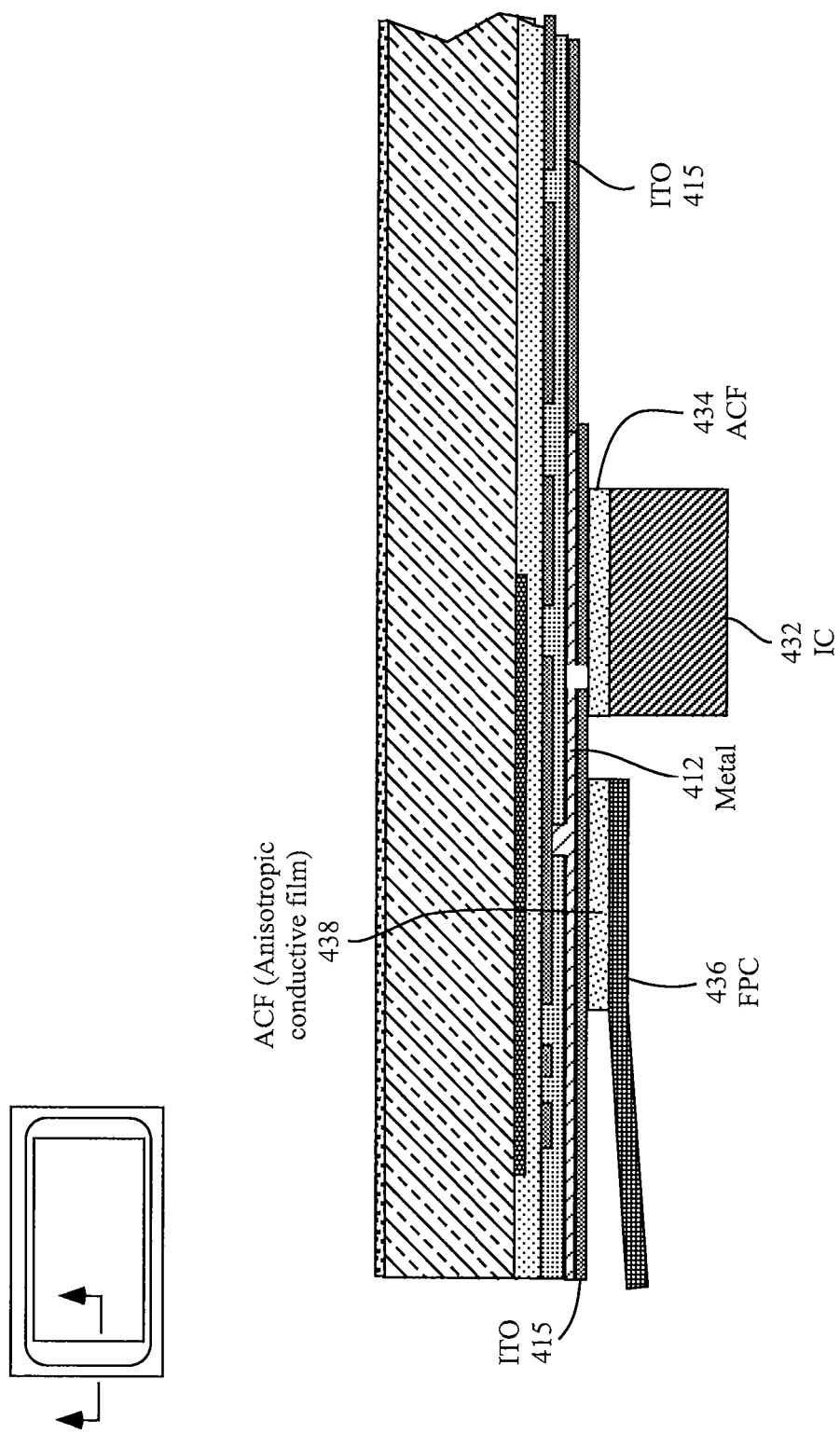

FIG. 4*g* shows IC 432 that can be bonded to the second layer of ITO 415 using ACF 434, and FPC 436 that can be bonded to the second layer of ITO using ACF 438. The view shown is along the short edge of the exemplary second upper layer subassembly, as shown in the thumbnail.

FIG. 4*h* shows encapsulent 442 formed around IC 432 and FPC 436 to lock them in place. The second upper layer subassembly can then be scribed and separated to form individual parts, and the final edges can be shaped, finished and cleaned using grinding and polishing techniques, as described above.

Figure 4I:
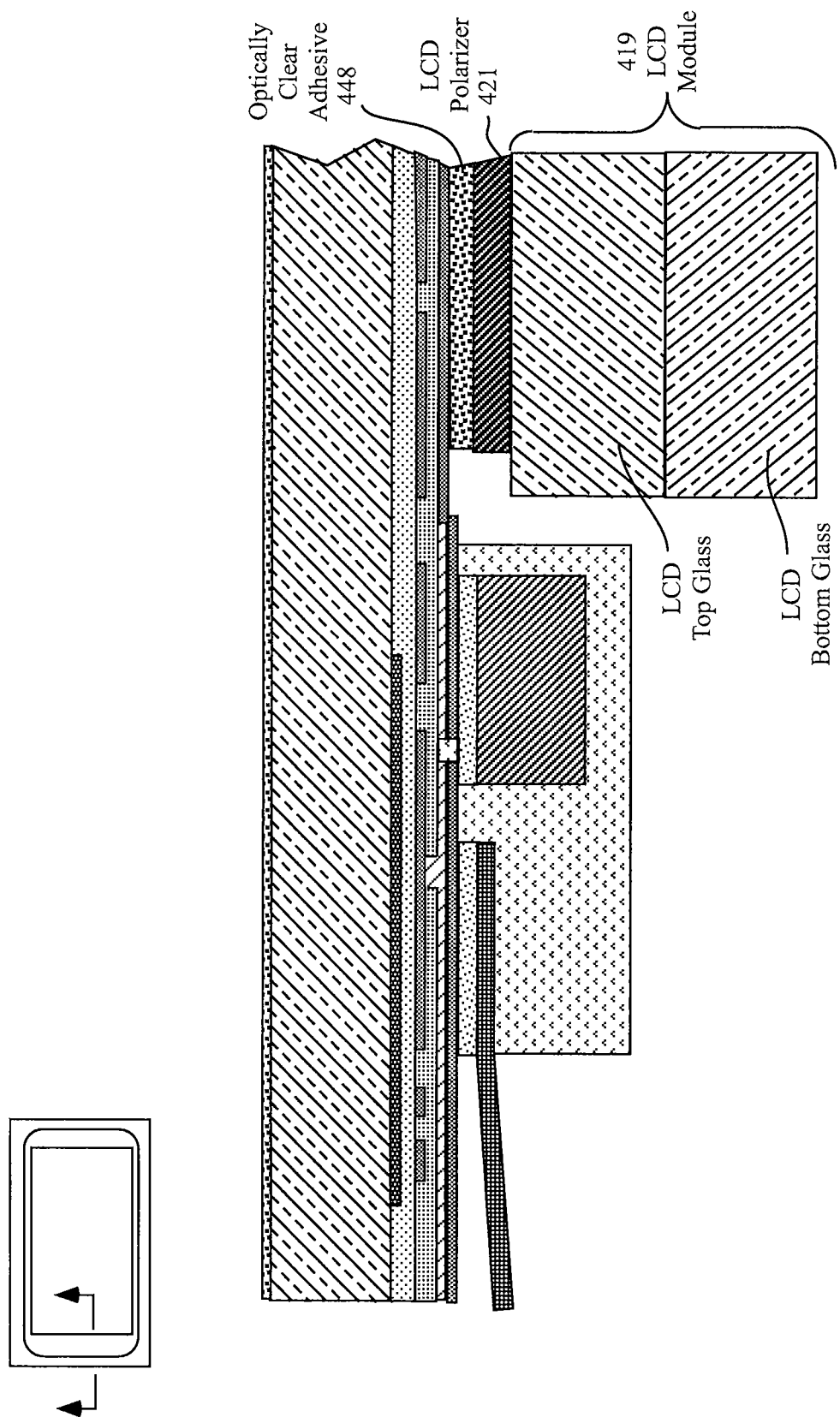

FIG. 4*i* shows the lamination of the exemplary second upper layer subassembly to exemplary LCD module 419 using optically clear adhesive 448 to form the exemplary fourth touchscreen. In FIG. 4*i*, LCD module 419 can include LCD polarizer 421 with conductive anti-reflective (AR) coating 423 on its top surface to serve as a shield for the touch panel.

Figure 4J:
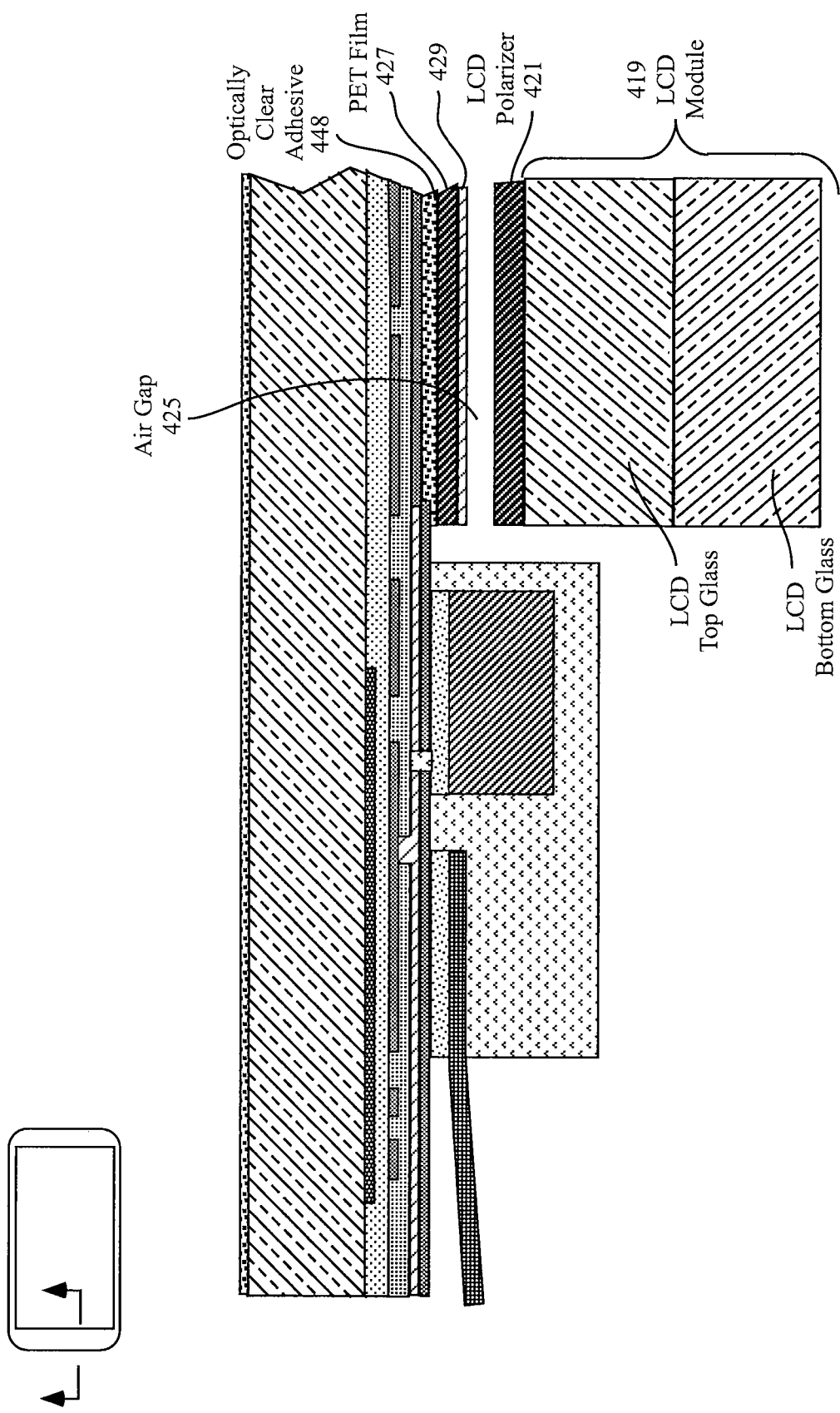

FIG. 4*j* shows an alternative method of laminating LCD module 419 to the exemplary second upper layer assembly by leaving air gap 425 between the two. In FIG. 4*z*, substantially transparent PET film 427 with a conductive anti-reflective bottom 429 can be applied to the top glass assembly to provide the shielding for the touch panel. The anti-reflective coating 429 can be formed from alternating layers of ITO and titanium dioxide or the like.

It should be noted that the exemplary upper layer subassemblies of FIGS. 1-4 can act as both a cover and as a substrate for the formation of the sensor panel.

FIGS. 5*a* through 5*d* illustrate an exemplary fifth touchscreen that can be formed by an exemplary third upper layer subassembly and the exemplary LCD module according to one embodiment of this invention.

Figure 5A:
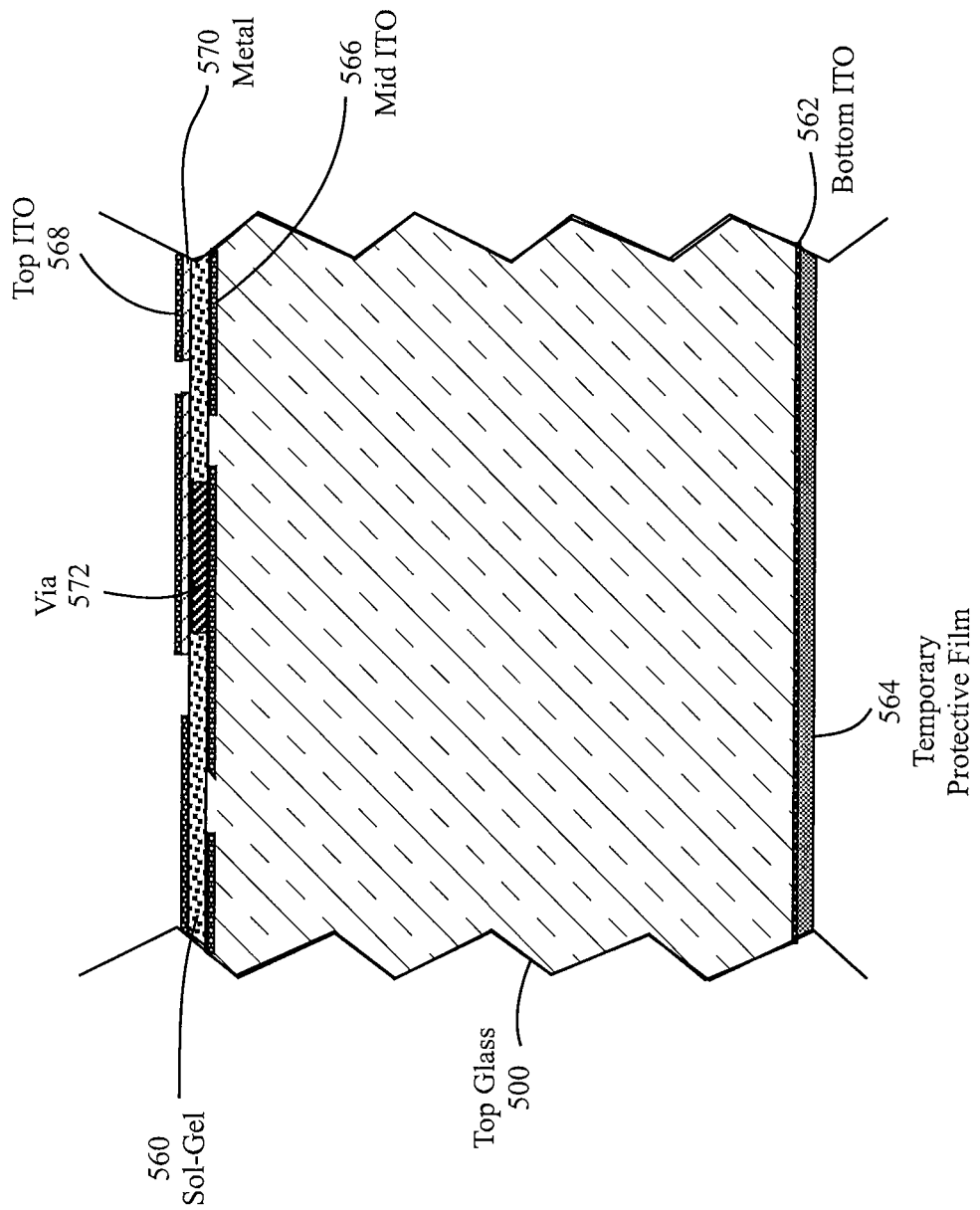
FIGS. 5a through 5d illustrate an exemplary fifth touchscreen that can be formed by an exemplary third upper layer subassembly and the exemplary LCD module according to one embodiment of this invention.
Figure 5B:
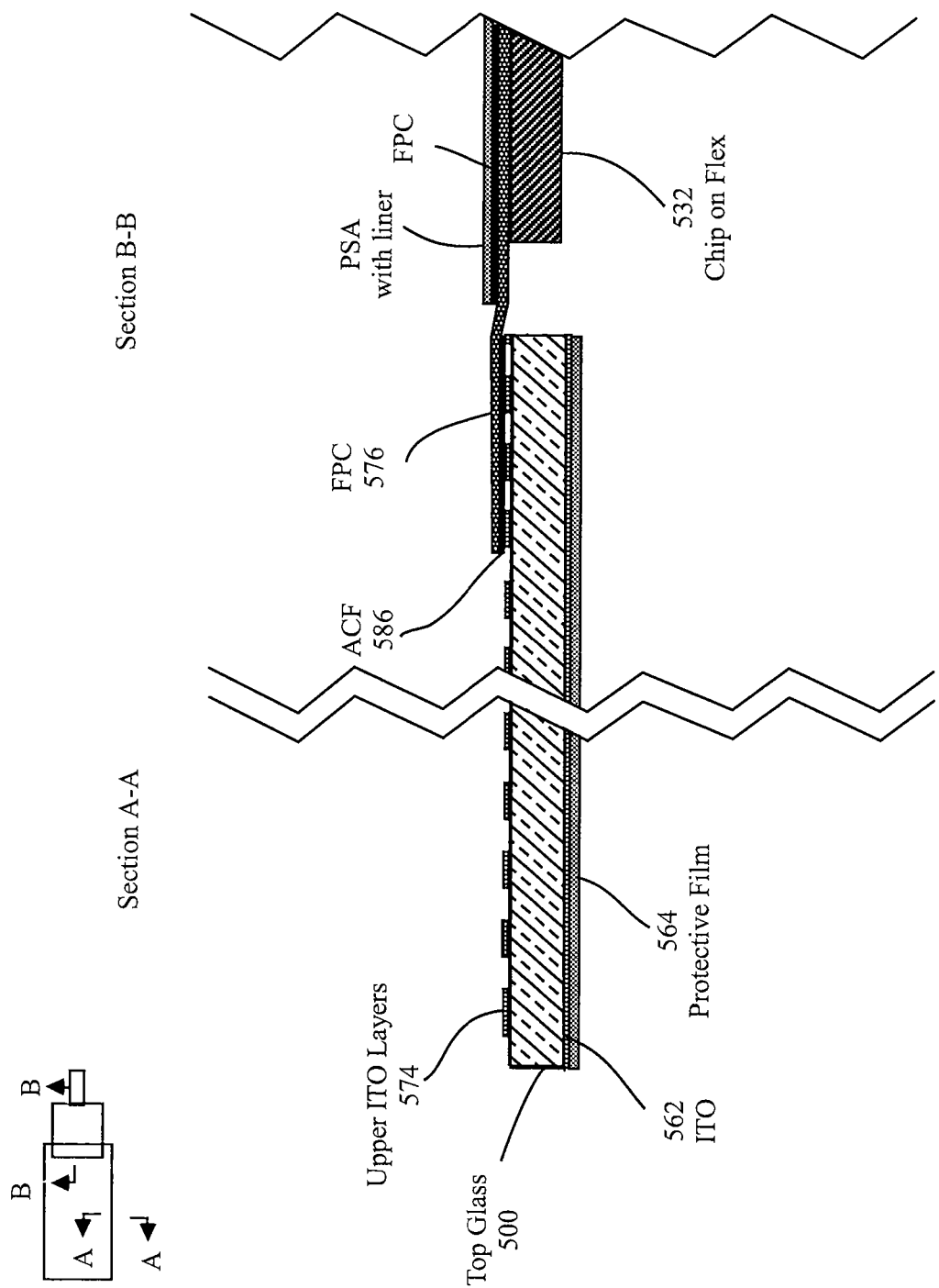
Figure 5C:
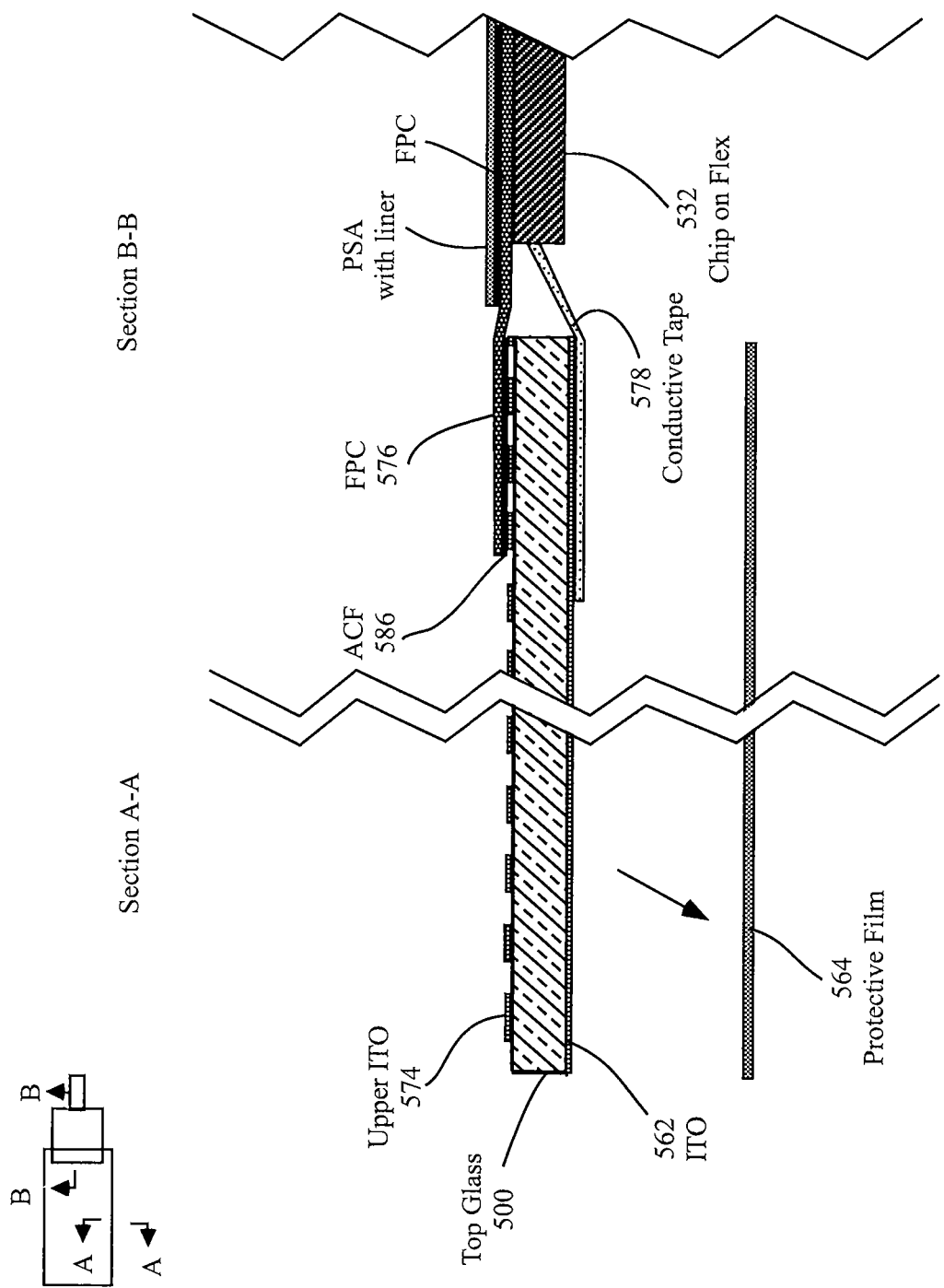

FIGS. 5*a* through 5*c* illustrate an exemplary third upper layer subassembly according to embodiments of the invention, in which a touch sensor panel can be formed by forming row and column traces on the same side of a single top glass substrate. FIG. 5*a* shows a finished soda-lime top glass 500, showing two layers on the top of top glass 500 and a shield on the bottom of the top glass. In particular, ITO 566 can be formed on the top of top glass 500 and patterned to form column traces. Sol-Gel 560 of 0.025 thickness and an optical index similar to that of ITO 566 can then be formed on ITO 566 and patterned to form vias 572. Vias 572 can be filled with a conductive material. Metal 570 can then be formed and patterned over Sol-Gel 560 to form traces along the borders of the subassembly. A second layer of ITO 568 can then be formed and patterned over metal 570 and Sol-Gel 560 to form row traces. Sol-Gel 560 can have dielectric properties which can enable the row and column traces formed in ITO layers 566 and 568 to experience a mutual capacitance between them at crossover points and act as touch sensors. ITO rows and columns 566 and 568 can have a resistivity of 10 to 200 ohms per square and are formed as 0.030 lines and spaces. Metal 570 can have a resistivity of 0.2 ohms per square and formed as 0.030 lines and spaces. Vias 572 connect metal traces 570 to the bottom ITO 566.

Bottom ITO layer 562 having a resistivity of 500 ohms per square can then be applied to the bottom of top glass 500, and then covered by temporary protective film 564. ITO 562 can act a shield for the sensing columns. Note that the exemplary third upper layer subassembly of FIG. 5b can require an additional cover (not shown). The exemplary third upper layer subassembly can then be scribed and cut into individual parts.

Figure 5D:
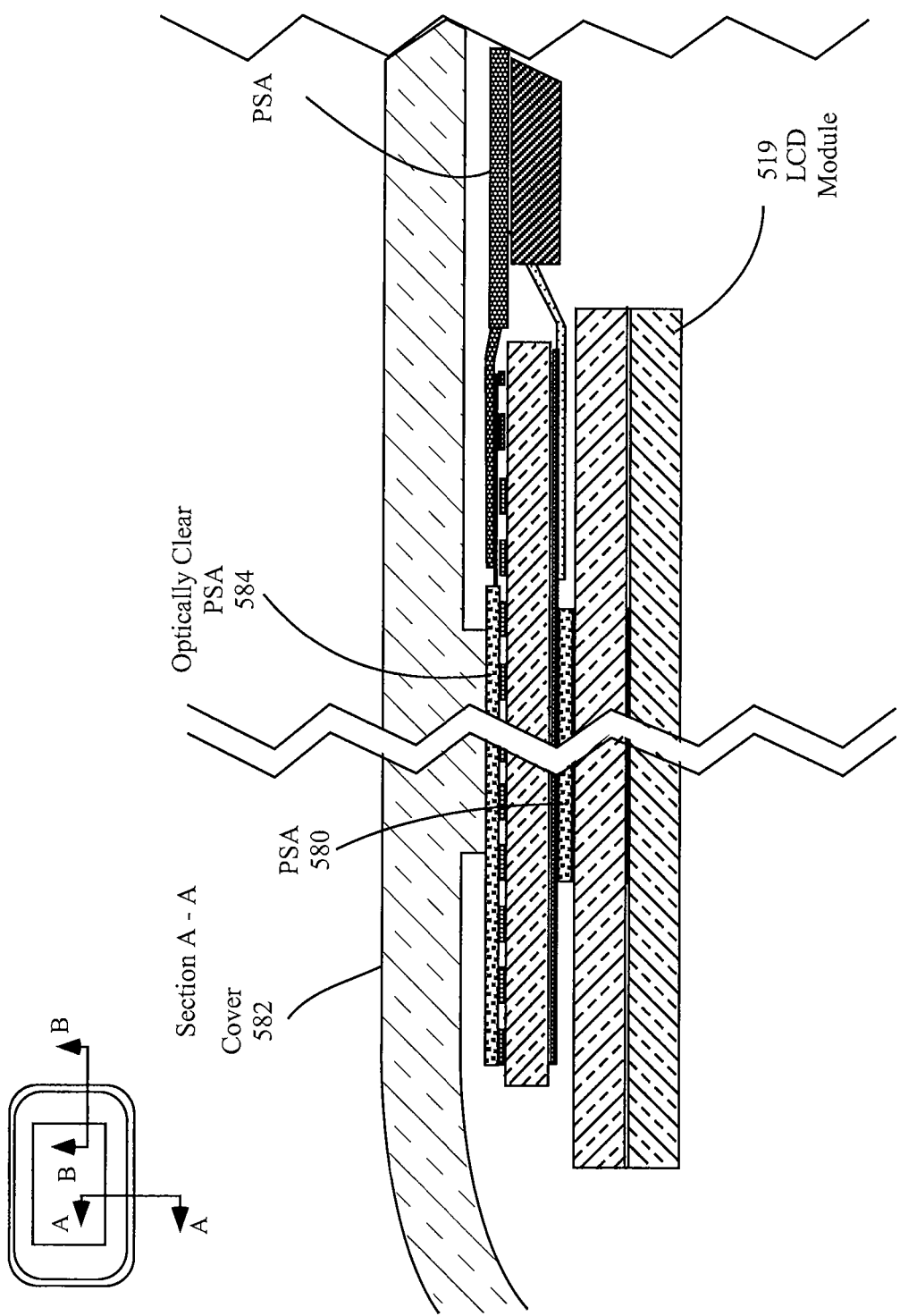

FIG. 5b shows top glass 500 after it has been scribed and broken into individual parts, with dashed line 574 symbolically representing the two ITO layers on top of the top glass and separated by the Sol-Gel dielectric. In FIG. 5d, FPC 576 can be attached using ACF 586, and IC 532 can be bonded to FPC 576 instead of directly to the traces on the substrate, because IC 532 would interfere with the ability of the glass assembly to be flush-mounted to a cover.

FIG. 5c shows the step of removing protective layer 564, and grounding the bottom side ITO 562 using conductive tape 578 for shielding LCD noise.

FIG. 5d shows the exemplary third upper layer subassembly that can be bonded to LCD module 519 using optically clear PSA 580, and cover 582 that can be bonded to the exemplary third upper layer subassembly using optically clear adhesive 584, which should be thicker (e.g. 0.100) then the FPC attached to the top of glass.

A number of different computing systems can be operable with the touchscreen stackups described above according to embodiments of this invention. A touchscreen, which can include a sensor panel and a display device (e.g. an LCD module), can be connected to other components in the computing system through connectors integrally formed on the sensor panel, or using flex circuits. The computing system can include one or more panel processors and peripherals, and a panel subsystem. The one or more processors can include, for example, ARM968 processors or other processors with similar functionality and capabilities. However, in other embodiments, the panel processor functionality can be implemented instead by dedicated logic such as a state machine. Peripherals can include, but are not limited to, random access memory (RAM) or other types of memory or storage, watchdog timers and the like.

The panel subsystem can include, but is not limited to, one or more analog channels, channel scan logic and driver logic. The channel scan logic can access RAM, autonomously read data from the analog channels and provide control for the analog channels. This control can include multiplexing columns of the multi-touch panel to analog channels. In addition, channel scan logic can control the driver logic and stimulation signals being selectively applied to rows of the multi-touch panel. In some embodiments, the panel subsystem, panel processor and peripherals can be integrated into a single application specific integrated circuit (ASIC).

Driver logic can provide multiple panel subsystem outputs and can present a proprietary interface that drives a high voltage driver. The high voltage driver can provide level shifting from a low voltage level (e.g. complementary metal oxide semiconductor (CMOS) levels) to a higher voltage level, which can provide a better signal-to-noise (S/N) ratio for noise reduction purposes. Panel subsystem outputs can be sent to a decoder and a level shifter/driver, which can selectively connect one or more high voltage driver outputs to one or more panel row inputs through a proprietary interface and can enable the use of fewer high voltage driver circuits in the high voltage driver. Each panel row input can drive one or more rows in a multi-touch panel. In some embodiments, the high voltage driver and decoder can be integrated into a single ASIC. However, in other embodiments the high voltage driver and decoder can be integrated into the driver logic, and in still other embodiments the high voltage driver and decoder can be eliminated entirely.

The computing system can also include a host processor for receiving outputs from the panel processor and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor can also perform additional functions that may not be related to panel processing, and can be coupled to program storage and a display device such as an LCD for providing a user interface (UI) to a user of the device.

As mentioned above, the multi-touch panel can in some embodiments include a capacitive sensing medium having a plurality of row traces or driving lines and a plurality of column traces or sensing lines separated by a dielectric. In some embodiments, the dielectric material can be transparent, such as PET or glass. The row and column traces can be formed from a transparent conductive medium such as ITO or antimony tin oxide (ATO), although other non-transparent materials such as copper can also be used. In some embodiments, the row and column traces can be perpendicular to each other, although in other embodiments other non-orthogonal orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as may be used herein are intended to encompass not only orthogonal grids, but the intersecting traces of other geometric configurations having first and second dimensions (e.g. the concentric and radial lines of a polar-coordinate arrangement).

At the "intersections" of the traces, where the traces pass above and below each other (but do not make direct electrical contact with each other), the traces essentially form two electrodes. Each intersection of row and column traces can represent a capacitive sensing node and can be viewed as a picture element (pixel), which can be particularly useful when the multi-touch panel is viewed as capturing an "image" of touch. (In other words, after the panel subsystem has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) When the two electrodes are at different potentials, each pixel can have an inherent self or mutual capacitance formed between the row and column electrodes of the pixel. If an AC signal is applied to one of the electrodes, such as by exciting the row electrode with an AC voltage at a particular frequency, an electric field and an AC or signal capacitance can be formed between the electrodes, referred to as Csig. The presence of a finger or other object near or on the multi-touch panel can be detected by measuring changes to Csig. The columns of the multi-touch panel can drive one or more analog channels in the panel subsystem. In some embodiments, each column can be coupled to one dedicated analog channel. However, in other embodiments, the columns can be couplable via an analog switch to a fewer number of analog channels.

The touchscreen stackups described above can be advantageously used in the computing system to provide a space-efficient touch sensor panel and UI.

A number of different mobile telephones can include the touchscreen stackups and computing system described above according to embodiments of the invention. PSA can be used to bond the sensor panel to a display device (e.g. LCD module). A number of different digital audio/video players can also include the touchscreen stackups and computing system described above according to embodiments of the invention. These mobile telephones and digital audio/video players can advantageously benefit from the touchscreen stackups described above because the touchscreen stackups allow these devices to be smaller and less expensive, which can be important consumer factors that can have a significant effect on consumer desirability and commercial success.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for determining an amount of force being applied to a touch screen, comprising:
    forming one or more first traces of conductive material on a first layer;
    forming one or more second traces of conductive material on a second layer;
    sealing a gap between at least one first trace and at least one second trace in a non-transparent area of the touch screen to create an elastic fluid-tight seal between and coupled to at least one first trace and at least one second trace in the non-transparent area; and
    determining the amount of the applied force based on a change in a separation of the at least one first trace and the at least one second trace in the non-transparent area at a location of the elastic fluid-tight seal due to compression of the seal due to the applied force.

2. The method of claim 1, further comprising forming the one or more first traces on a second side of a cover glass, the cover glass also having a first side opposite the second side capable of being touched.

3. The method of claim 2, further comprising forming the one or more second traces on a substrate.

4. The method of claim 1, further comprising creating the elastic fluid-tight seal by forming compressible spacers in the gap.

5. A method for determining an amount of force being applied to a touch screen, comprising:
    forming one or more first traces and one or more second traces of substantially transparent conductive material;
    separating the one or more first traces and the one or more second traces and sealing a gap between at least one first trace and at least one second trace in a non-transparent area of the touch screen to create an elastic fluid-tight seal between and coupled to at least one first trace and at least one second trace in the non-transparent area and enable a capacitance to be generated at the one or more first traces and the one or more second traces; and
    determining the amount of the applied force based on a change in the capacitance at the at least one first trace or the at least one second trace in the non-transparent area at a location of the elastic fluid-tight seal due to compression of the seal.

6. The method of claim 5, further comprising forming the one or more first traces on a second side of a first substrate having a first side capable of being touched, the second side opposite the first side.

7. The method of claim 6, further comprising forming the one or more second traces on a second substrate.

8. The method of claim 5, further comprising creating the elastic fluid-tight seal using one or more compressible spacers, the one or more compressible spacers capable of being compressed during the application of the force and changing the capacitance at the one or more first traces and the one or more second traces.

9. A force-sensitive touch screen, comprising:
    one or more first traces of conductive material formed in a first layer;
    one or more second traces of conductive material formed in a second layer;
    at least one elastic fluid-blocking spacer formed between and coupled to at least one first trace and at least one second trace in a non-transparent area of the touch screen, the at least one elastic fluid-blocking spacer configured for
        creating a fluid-tight seal between the at least one first trace and the at least one second trace; and
        enabling a change in separation of the at least one first trace and the at least one second trace in the non-transparent area at a location of the elastic fluid-blocking spacer due to compression of the spacer upon an application of force to the touch screen.

10. The force-sensitive touch screen of claim 9, further comprising a cover glass having a first side capable of being touched, and a second side opposite the first side on which the one or more first traces are formed.

11. The force-sensitive touch screen of claim 10, further comprising a substrate having the one or more second traces formed thereon.

12. The force-sensitive touch screen of claim 9, the force-sensitive touch screen incorporated into a computing system.

13. The force-sensitive touch screen of claim 12, the computing system incorporated into a mobile telephone.

14. The force-sensitive touch screen of claim 12, the computing system incorporated into a portable computing device.

15. A force-sensitive touch screen, comprising:
    first and second means for capacitive sensing separated by a gap;
    means for sealing the gap between at least one of the first means and at least one of the second means in a non-transparent area of the touch screen to create an elastic fluid-tight seal between and coupled to at least one of the first means and at least one of the second means in the non-transparent area; and means for changing the separation of the at least one first means and the at least one second means in the non-transparent area at a location of the gap sealing means due to compression of the gap-sealing means upon an application of force to the touch screen.

16. The force-sensitive touch screen of claim 15, further comprising a cover glass having a first side capable of being touched, and a second side opposite the first side on which the first means are formed.

17. The force-sensitive touch screen of claim 16, further comprising a substrate having the second means formed thereon.

18. The force-sensitive touch screen of claim 15, the force-sensitive touch screen incorporated into a portable computing device.

* * * * *